(12) United States Patent
Morabito

(10) Patent No.: US 11,603,023 B2
(45) Date of Patent: Mar. 14, 2023

(54) LOCKOUT ASSEMBLY FOR FOLDING VEHICLE SEATS

(71) Applicant: Waymo LLC, Mountain View, CA (US)

(72) Inventor: Richard Morabito, Grosse Ile, MI (US)

(73) Assignee: Waymo LLC, Mountain View, CA (US)

(*) Notice: Subject to any disclaimer, the term of this patent is extended or adjusted under 35 U.S.C. 154(b) by 329 days.

(21) Appl. No.: 16/799,105

(22) Filed: Feb. 24, 2020

(65) Prior Publication Data

US 2021/0253008 A1     Aug. 19, 2021

Related U.S. Application Data

(63) Continuation-in-part of application No. 29/724,351, filed on Feb. 14, 2020.

(51) Int. Cl.
*B60N 2/90* (2018.01)
*E05B 79/04* (2014.01)
(Continued)

(52) U.S. Cl.
CPC .............. *B60N 2/919* (2018.02); *E05B 79/04* (2013.01); *B60N 2/005* (2013.01); *B60N 2/30* (2013.01); *B60N 2002/952* (2018.02)

(58) Field of Classification Search
CPC ...... B60N 2/919; B60N 2/2245; B60N 2/366; B60N 2002/967; B60N 2002/952; E05B 79/04; Y10S 292/11
(Continued)

(56) References Cited

U.S. PATENT DOCUMENTS 2,815,796 A * 12/1957 Lobanoff ................. B60N 2/20
                                                                296/68.1
4,176,989 A * 12/1979 Wolff .................... B23B 47/288
                                                                408/72 R
(Continued)

FOREIGN PATENT DOCUMENTS

CN   107031695 A  *  8/2017   ............... B62B 7/06
CN   108544991 A  *  9/2018   ........... B60N 2/2245
(Continued)

OTHER PUBLICATIONS

Terauchi, Takeshi et al. Perambulator, CN 107031695 Machine Translation, ip.com, Aug. 11, 2017 (Year: 2017).*
(Continued)

*Primary Examiner* — Jason S Morrow
*Assistant Examiner* — Wenwei Zhuo
(74) *Attorney, Agent, or Firm* — Botos Churchill IP Law

(57) ABSTRACT

The technology provides a lockout assembly that covers a latching mechanism, where the latching mechanism would enable a passenger to fold down the rear seat(s) of a vehicle. This can be particularly beneficial when the vehicle is operating in an autonomous driving mode, because certain areas within the vehicle may be restricted from passenger access. For instance, access to the trunk or cargo area may be limited to authorized service personnel. The lockout assembly includes a base unit and a cover. The cover is releasably secured to the base unit using one or more clip members. The base unit is fixedly secured to a receptacle of the latching mechanism using one or more fastener members, such as a screw. Once the cover is releasably secure, it may be completely or substantially flush with an inner edge of the receptacle.

20 Claims, 21 Drawing Sheets

(51) Int. Cl.
*B60N 2/005* (2006.01)
*B60N 2/30* (2006.01)

(58) Field of Classification Search
USPC ............... 296/65.03, 65.09, 68.1; 292/80
See application file for complete search history.

(56) References Cited

U.S. PATENT DOCUMENTS

| | | | | |
|---|---|---|---|---|
| 4,865,505 | A | * | 9/1989 | Okada ................. B60R 13/0206 411/512 |
| 5,816,640 | A | * | 10/1998 | Nishimura .............. B60R 5/006 296/37.16 |
| 6,036,036 | A | | 3/2000 | Bilani et al. |
| 6,074,150 | A | * | 6/2000 | Shinozaki ........... B60R 13/0206 24/297 |
| 6,108,178 | A | | 8/2000 | Beadles |
| 6,497,445 | B1 | * | 12/2002 | Combs, II ................ B60J 7/198 296/100.06 |
| 7,040,684 | B2 | | 5/2006 | Tame et al. |
| 7,188,392 | B2 | * | 3/2007 | Giugliano .............. F16B 5/065 24/295 |
| 7,530,638 | B2 | | 5/2009 | Day et al. |
| 7,753,402 | B2 | * | 7/2010 | Volkmann ........... B60R 21/217 24/295 |
| 7,900,953 | B2 | * | 3/2011 | Slobodecki ........... F16B 21/075 280/730.2 |
| 9,914,406 | B1 | * | 3/2018 | Hemker ............. B60R 13/0243 |
| 10,060,166 | B2 | | 8/2018 | Sayama et al. |
| 2004/0149791 | A1 | | 8/2004 | Tuel et al. |
| 2007/0080553 | A1 | * | 4/2007 | Kim ......................... B60R 7/04 296/37.1 |
| 2010/0186539 | A1 | * | 7/2010 | Simeonidis ............... F16C 1/10 74/502.2 |
| 2012/0274457 | A1 | * | 11/2012 | Burns ..................... E05B 85/18 70/91 |
| 2013/0221726 | A1 | | 8/2013 | Kalinowski |
| 2016/0031490 | A1 | * | 2/2016 | Lawrence .............. E05B 53/00 296/191 |
| 2017/0126810 | A1 | * | 5/2017 | Kentley ............. G06F 3/04842 |
| 2018/0257520 | A1 | * | 9/2018 | Shirai .................... B60N 2/366 |
| 2020/0001751 | A1 | | 1/2020 | Di Giusto et al. |

FOREIGN PATENT DOCUMENTS

| | | | | |
|---|---|---|---|---|
| DE | 102004037289 | A1 | * 3/2006 | ............ B60N 2/366 |
| WO | 0123206 | A1 | 4/2001 | |

OTHER PUBLICATIONS

Hou, Hui et al. Backrest Unlocking Structure, CN 108544991 Machine Translation, Sep. 18, 2018 (Year: 2018).*
OxGord—Rear Gray Folding Bucket Seat Release Latch, https://www.carid.com/oxgord/rear-gray-folding-bucket-seat-release-latch-mpn-gmfl-0006-gy.html, retrieved from the internet Jan. 6, 2020, pp. 1-2.
Vehicle Controls, Adjusting the Front Seats, 2019, pp. 1-15.
"Amazon.com: Seat Back Latch Release Handle—Best for Folding Rear Row Bucket Fits 00-06 Silverado, Tahoe, Avalanche, Suburban, Si . . . ;", https://www.amazon.com/Seat-Back-Latch-Release-Handle/dp/B01LWLWNL0?SubscriptionId=AKIAIQ57RNIFDKS36G5Q&tag=gistg-0&linkCode=x . . . ; retrieved from the Internet Jan. 6, 2020, pp. 1-7.
Geiger, Jennifer, Good News for Families! Installing a Car Seat Is Getting Easier, Cars.com, Jun. 6, 2019, pp. 1-7.

* cited by examiner

220

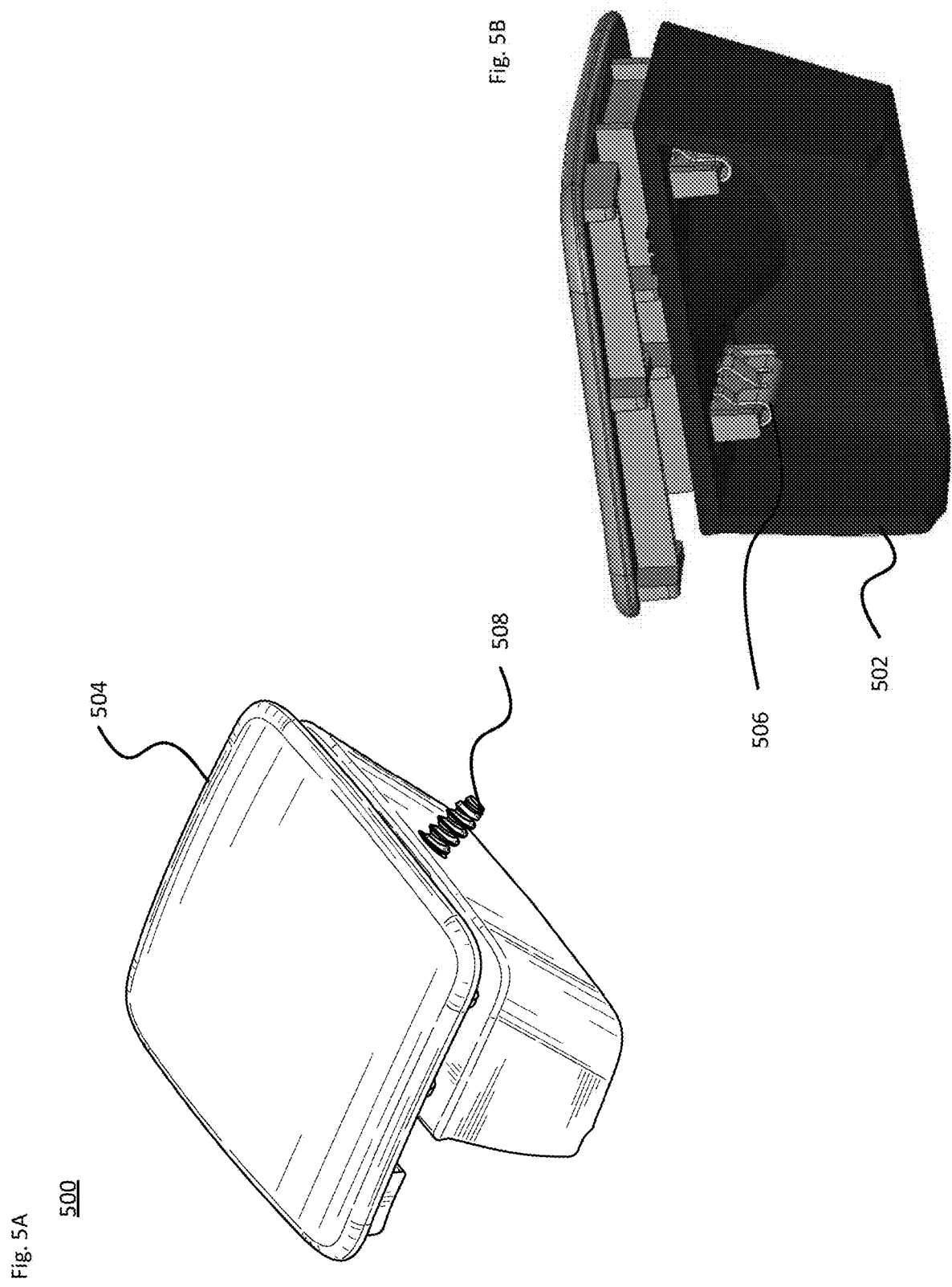

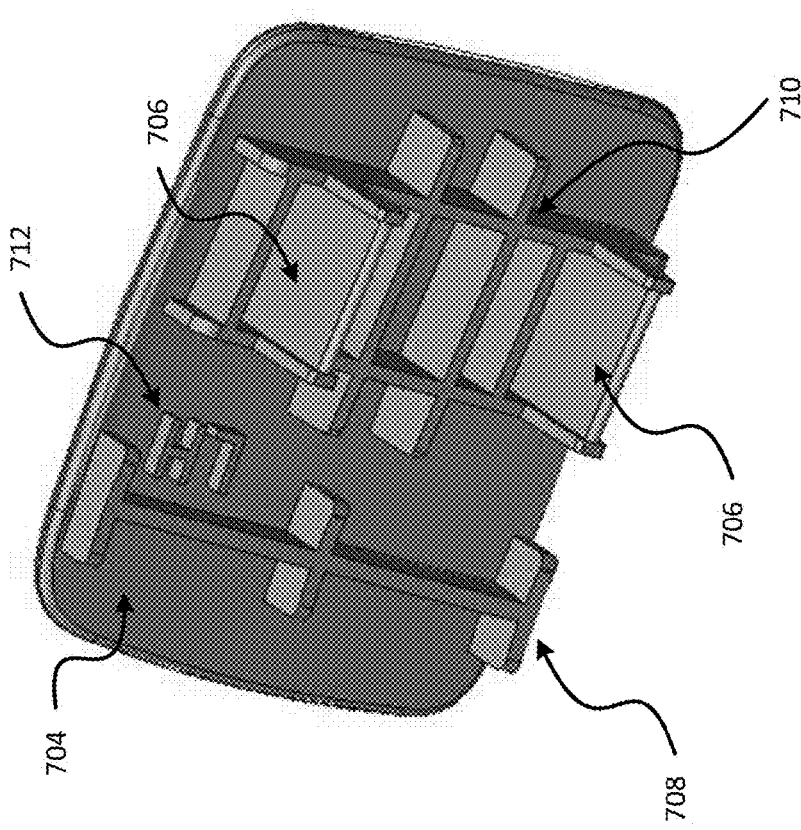
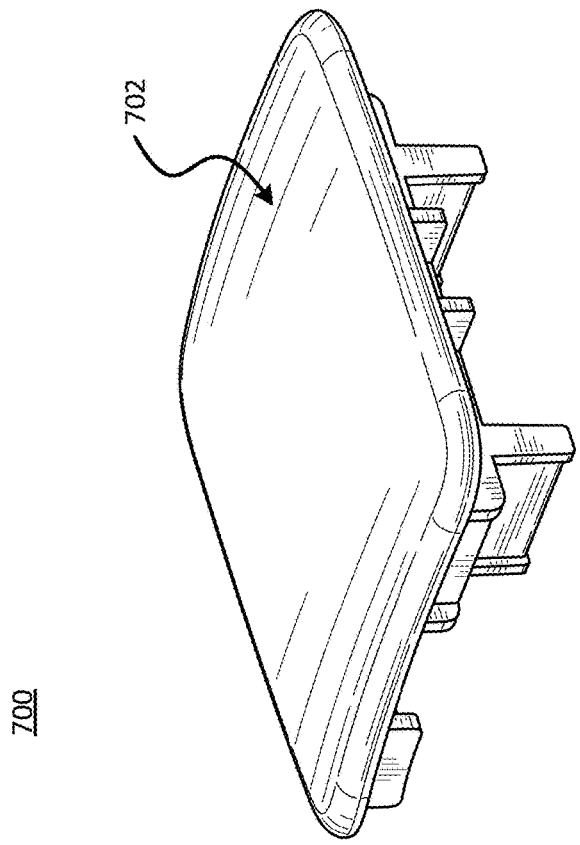
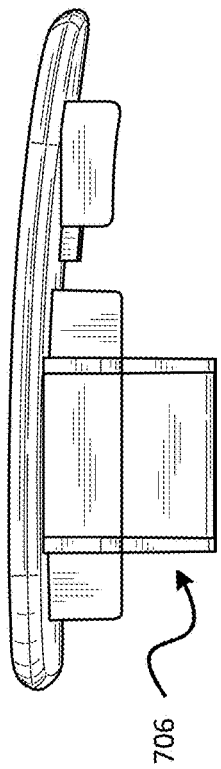
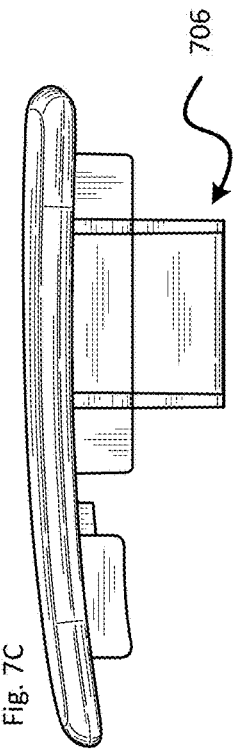

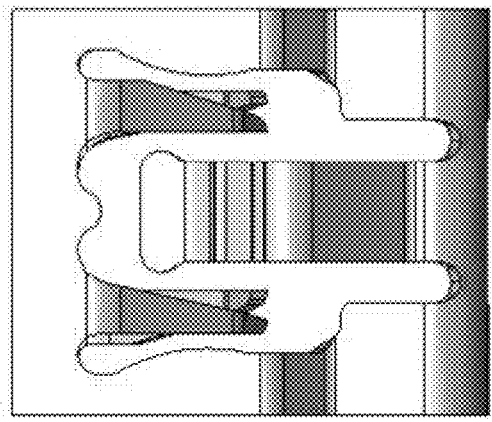
Fig. 8C
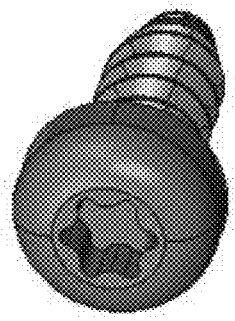
Fig. 9
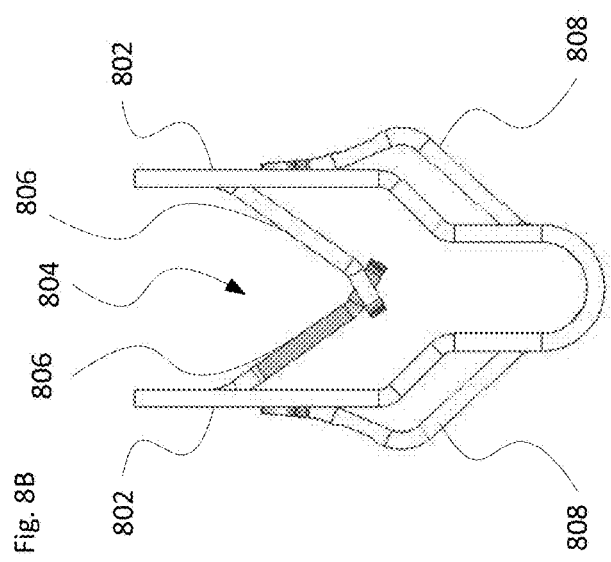
Fig. 8B
Fig. 8E
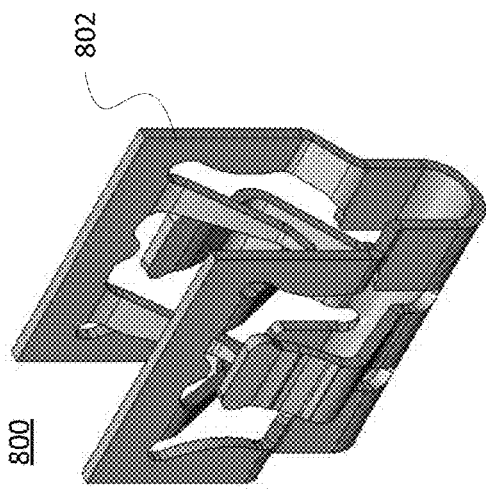
Fig. 8A
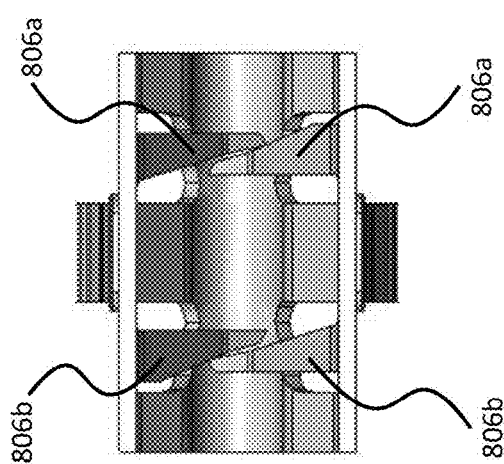
Fig. 8D

LOCKOUT ASSEMBLY FOR FOLDING VEHICLE SEATS

CROSS-REFERENCE TO RELATED APPLICATIONS

This application is a continuation-in-part of U.S. Design patent application No. 29/724,351, filed Feb. 14, 2020, the entire disclosure of which is incorporated by reference herein.

BACKGROUND

Autonomous vehicles, such as vehicles that do not require a human driver, can be used to aid in the transport of passengers from one location to another. Such vehicles may operate in a fully autonomous mode without a person providing driving input, or in a partially autonomous mode with a driver having control over one or more aspects of vehicle operation.

BRIEF SUMMARY

When operating in an autonomous driving mode, certain areas within the vehicle may be restricted from passenger access. For instance, access to the trunk or cargo area may be limited to authorized personnel, such as vehicle service personnel. However, in many vehicles the trunk can be readily accessed via a latching mechanism located on the second row of seats, adjacent to the door, or elsewhere within the vehicle cabin. Aspects of the technology provide an easy to install lockout assembly that prevents passengers from actuating the latching mechanism, thereby restricting access to the trunk or other storage compartment.

According to one aspect, a lockout assembly is provided for a vehicle configured to operate in an autonomous driving mode. The lockout assembly includes a base unit and a cover. The base unit has a first section and a second section. The first section extends across the second section and has one or more slots therein. The second section includes a sidewall adapted to be received within a latching mechanism receptacle in a cabin of the vehicle. The base unit is configured to be fixedly secured within the latching mechanism receptacle. The cover has a first side and a second side opposite the first side, in which the first side provides a continuous surface to cover an opening of the latching mechanism receptacle, and the second side includes one or more projections removably coupled to the one or more slots of the base unit. When the base unit is fixedly secured within the latching mechanism receptacle, the cover is adapted to prevent passenger access to a latching mechanism within the latching mechanism receptacle so that one or more seats of the vehicle cannot be folded down.

The lockout assembly may further comprise a fastener. Here, the sidewall of the second section of the base unit includes a through hole, and the fastener is adapted to fixedly secured the base unit within the latching mechanism receptacle via the through hole and corresponding engagement with a sidewall of the latching mechanism receptacle. The lockout assembly may further comprise one or more clip members each at least partly received within a corresponding one of the one or more slots of the first section of the base unit. In this case, each of the one or more projections are received by corresponding ones of the one or more clip members. By way of example, each clip member may include a receptacle area adapted to receive a corresponding one of the one or more projections, and one or more pairs of opposing first arm members arranged within the receptacle area, in which the one or more pairs of opposing first arm members adapted to grip the corresponding projection. In one example, the one or more pairs of opposing first arm members comprise spring elements. In another example, each pair of the one or more pairs of opposing first arm members are offset with respect to one another. The lockout assembly may further include a set of opposing second arm members configured to secure the clip member to the base unit. In this case, the set of opposing second arm members are arranged external to the receptacle area. And in an alternative, each clip member at least partly extends above a top surface of the first section of the base unit and at least partly extends below a bottom surface of the first section of the base unit.

In another example, the second side of the cover further includes one or more reinforcement elements. Here, a given one of the reinforcement elements may be integrally formed with at least one of the projections.

The second side of the cover may further include an identifier to indicate which latching mechanism of the vehicle is to be covered. When the cover is covering the latching mechanism receptacle, the cover may provide a gap of no more than 3.0 mm between a perimeter of the cover and an inner edge of the latching mechanism receptacle. The cover may include a receptacle arranged along an edge thereof, in which the receptacle is adapted to receive a tool for removal of the cover from the base unit.

According to another aspect, a kit is provided that includes the lockout assembly and the tool configured to remove the cover from the base unit. The tool may include a loop of wire adapted for insertion in a gap between a perimeter of the cover and an inner edge of the latching mechanism receptacle.

The kit may further comprise a removable drill jig, wherein the removable drill jig includes a guide member arranged to align a drill bit with a predetermined location along a sidewall of the latching mechanism receptacle. In this case, the removable drill jig may further include a handle for insertion and removal of the drill jig into the latching mechanism receptacle.

And according to another aspect, a vehicle is configured to operate in an autonomous driving mode, wherein the vehicle includes the lockout assembly and the latching mechanism receptacle having the latching mechanism therein. The latching mechanism is configured to release a lock for the one or more seats so that the one or more seats are foldable, but when the lockout assembly is installed with the cover, a passenger of the vehicle is unable to release the lock to fold the seat(s).

In one example, the latching mechanism receptacle includes a slot arranged along an edge thereof. The slot is adapted to receive a tool for removal of the cover from the base unit.

BRIEF DESCRIPTION OF THE DRAWINGS

FIGS. 5A-B illustrate an example lockout assembly in accordance with aspects of the technology.

FIGS. 7A-H illustrate an example of a lockout assembly cover in accordance with aspects of the technology.

FIGS. 8A-E illustrate an example of a lockout assembly clip member in accordance with aspects of the technology.

FIG. 9 illustrates an example of a lockout assembly fastener in accordance with aspects of the technology.

DETAILED DESCRIPTION

For passengers riding in a self-driving vehicle, it may be important for a variety of reasons including safety, to prevent them from folding down the seats during the ride. The rear seats may be folded down to provide access to the trunk or other cargo space, but this may be undesirable in many self-driving situations. In one example, it may be possible to access this area by actuating a latching mechanism, which may be positioned on a side or back of the seat, next to the door, or in some other location. According to aspects of the technology, a lockout assembly is provided that includes locking figure and a snap on cover that prevents access to the latching mechanism. A drill assembly may also be used to pre-configure the latching mechanism to receive the lockout assembly.

Example Vehicle Systems

Figure 1A:
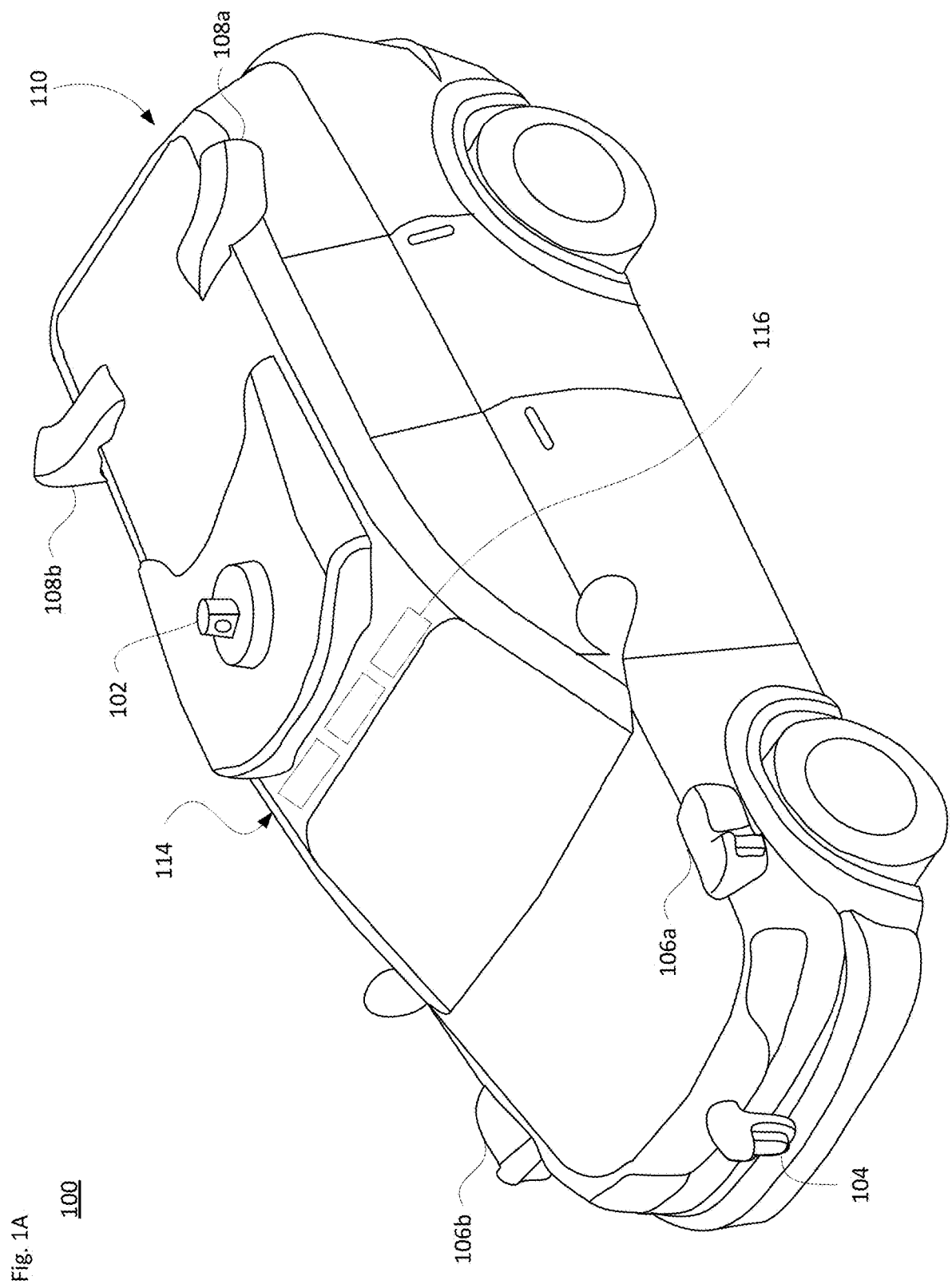
FIGS. 1A-B illustrate an example passenger-type vehicle configured for use with aspects of the technology.
Figure 1B:
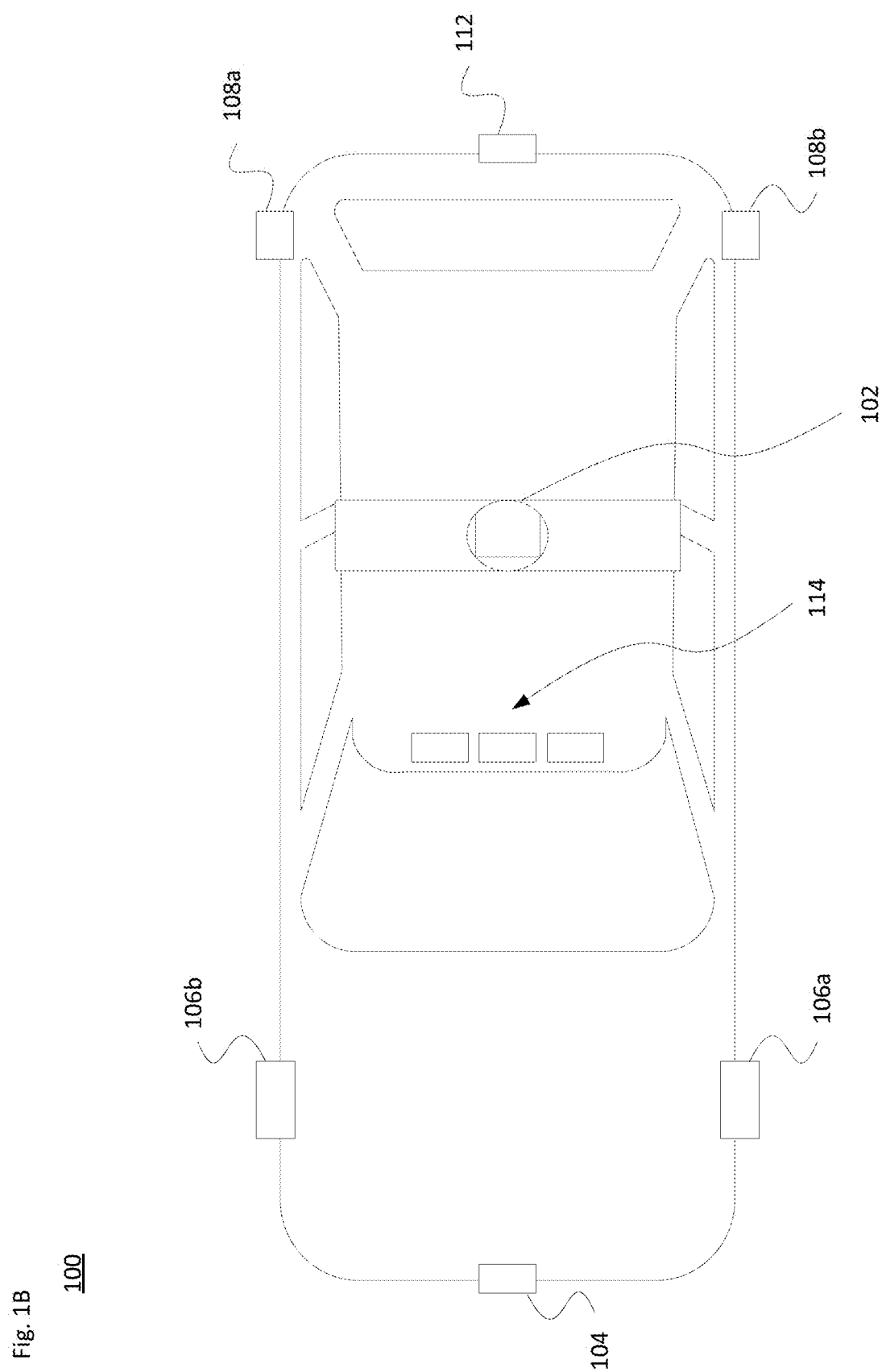

FIG. 1A illustrates a perspective view of an example passenger vehicle 100, such as a minivan, sport utility vehicle (SUV) or other vehicle. FIG. 1B illustrates a top-down view of the passenger vehicle 100. As shown, the passenger vehicle 100 includes various external sensors for obtaining information about the vehicle's outside environment, which enable the vehicle to operate in an autonomous driving mode. For instance, a roof-top housing 102 may include a lidar sensor as well as various cameras, radar units, infrared and/or acoustical sensors. Housing 104, located at the front end of vehicle 100, and housings 106*a*, 106*b* on the driver's and passenger's sides of the vehicle, may each incorporate lidar, radar, camera and/or other sensors. For example, housing 106*a* may be located in front of the driver's side door along a quarter panel of the vehicle. As shown, the passenger vehicle 100 also includes housings 108*a*, 108*b* for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

By way of example, each external sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy. The lockout arrangement may be particularly suitable for vehicles operating without a driver in Level 4 or Level 5 modes. Here, for instance, passengers may be seated in the back row of the vehicle, and it may be helpful to prevent access to the rear seat latching mechanism.

Figure 2A:
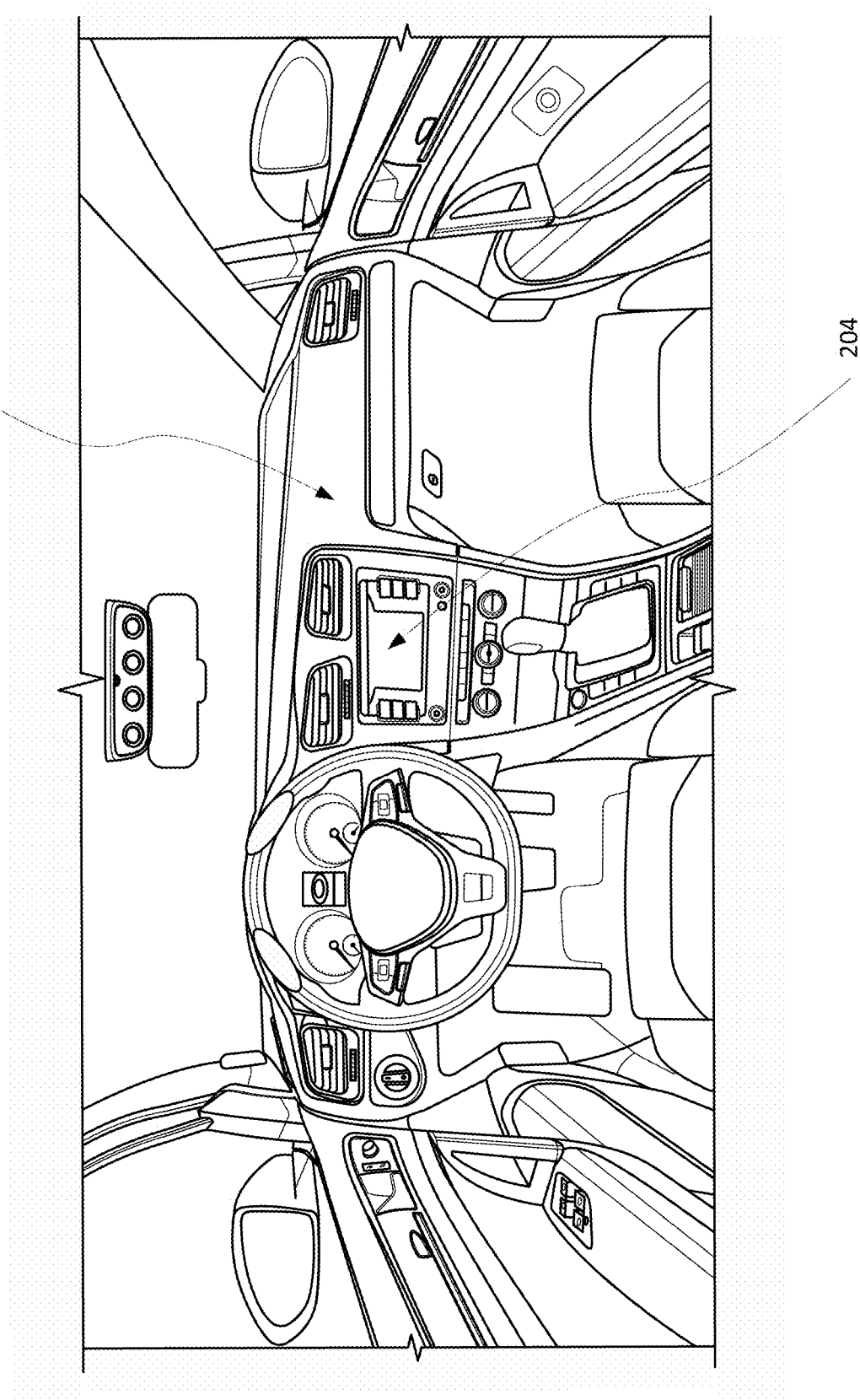
FIGS. 2A-C illustrate interior views of a vehicle of in accordance with aspects of the technology.

Turning to FIG. 2A, this figure illustrates an example view 200 within the cabin of the vehicle 100, for instance as seen from the front seats. In this view, a dashboard or console area 202 which includes an internal electronic display 204 is visible. Although vehicle 100 includes a steering wheel, gas (acceleration) pedal, or brake (deceleration) pedal which would allow for a semiautonomous or manual driving mode where a passenger would directly control the steering, acceleration and/or deceleration of the vehicle via the drivetrain, these inputs are not necessary for a fully autonomous driving mode. Rather, passenger input may be provided by interaction with the vehicle's user interface system and/or a wireless network connections for an app on the passenger's mobile phone or other personal computing device. By way of example, the internal electronic display 204 may include a touch screen or other user input device for entering information by a passenger such as a destination, etc. Alternatively, internal electronic display 204 may merely provide information to the passenger(s) and need not include a touch screen or other interface for user input.

Figure 2B:
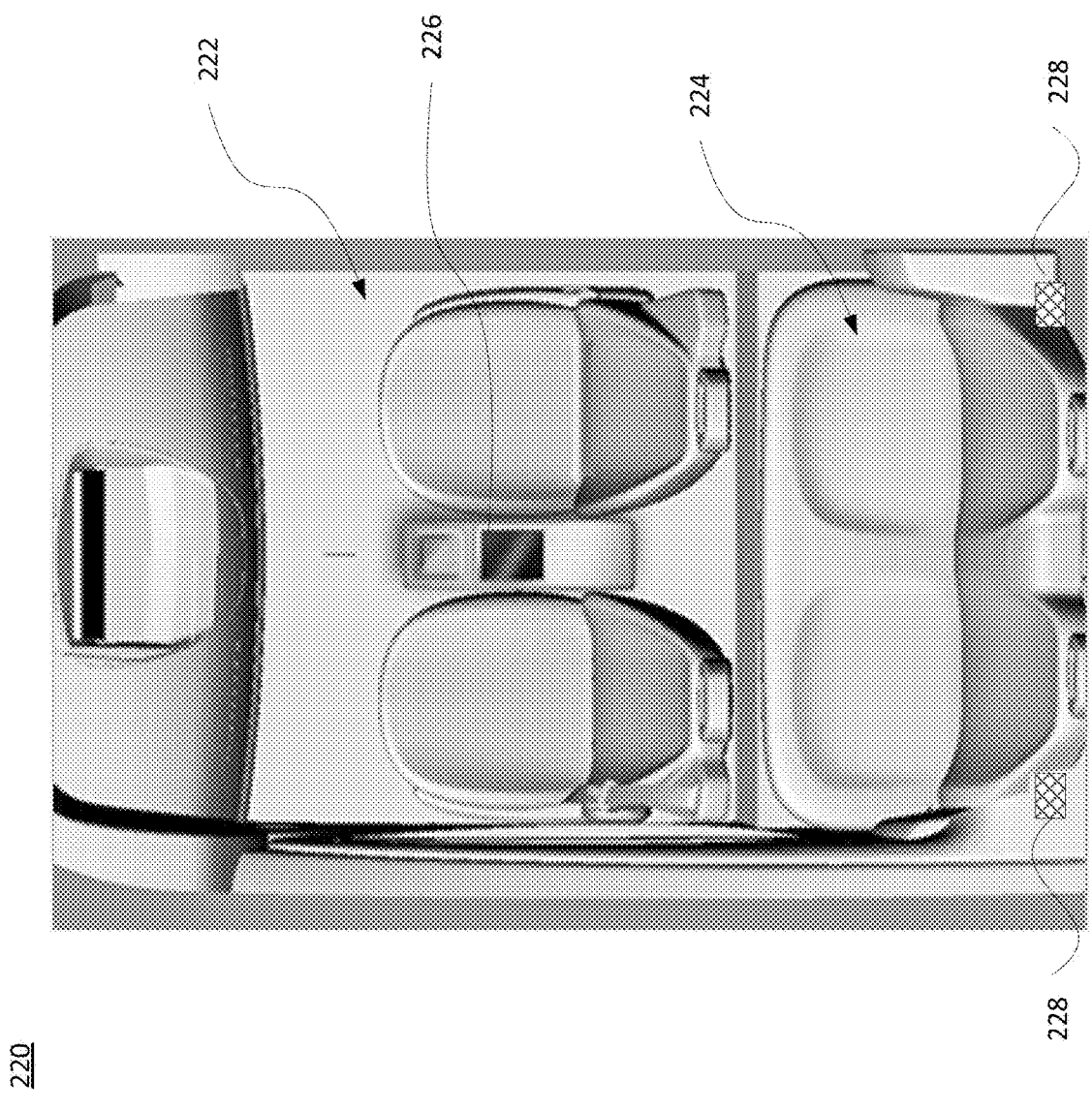
Figure 2C:
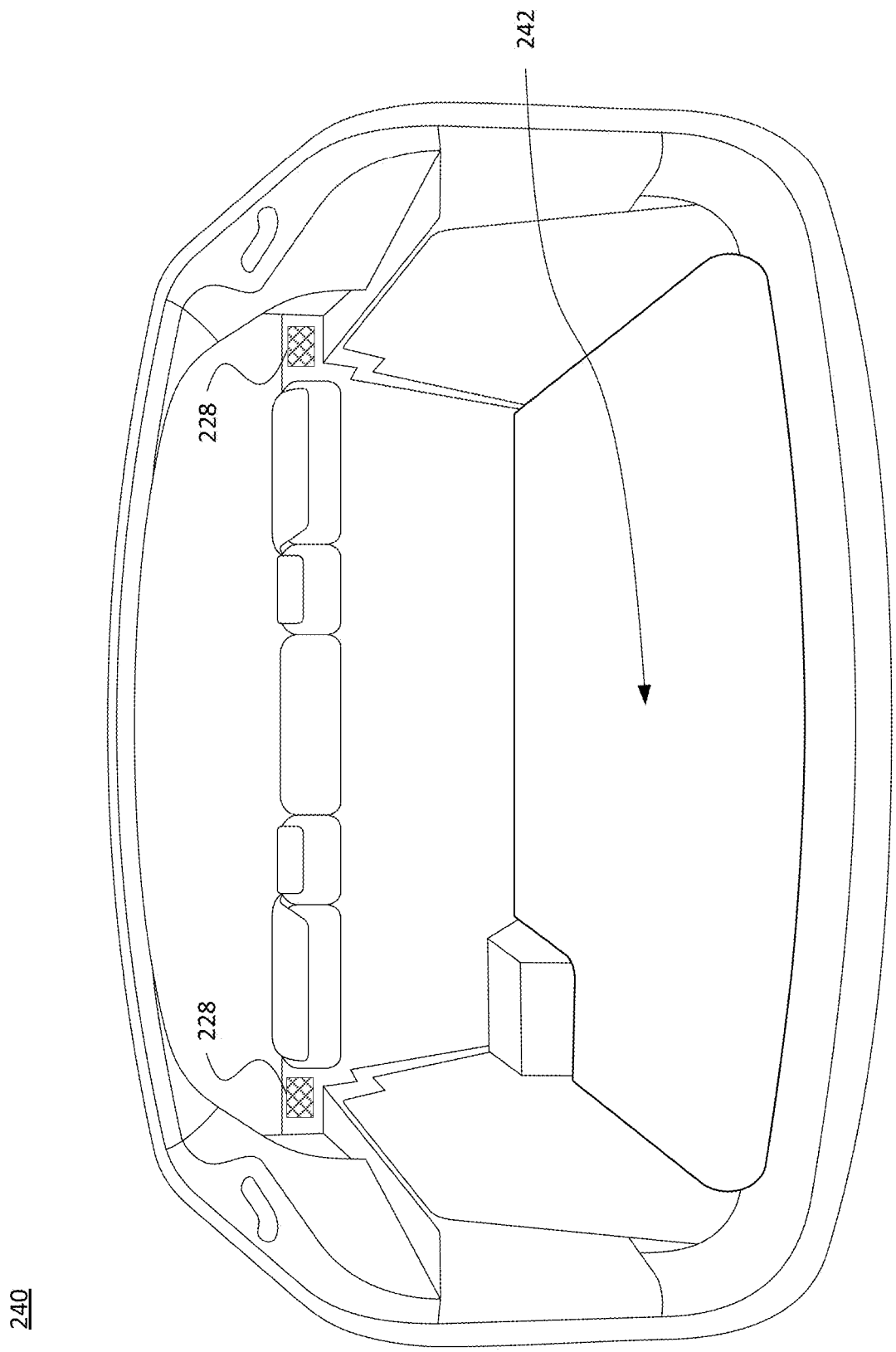

FIG. 2B illustrates a top-down view 220 of the vehicle cabin. As shown in this view, the cabin includes a front seat area 222 and a rear seat area 224. A center console 226 may be disposed between the front seats. One or more latching mechanisms 228 may be positioned on or near the rear seat area 224, in order to fold down one side or the entire rear seat. FIG. 2C illustrates a perspective view 240 of a trunk region or other cargo space 242 of the vehicle, facing towards the front of the vehicle. As shown, the latching mechanism(s) 228 may be located along a side of the rear seat, for instance adjacent to a door of the vehicle. Actuating the latching mechanism 228 and folding down the rear seat(s) provides access to the trunk region 242. This may be undesirable in a self-driving mode, for instance to promote passenger safety or to limit access to components of the self-driving system that may be located in this area of the vehicle.

Figure 3:
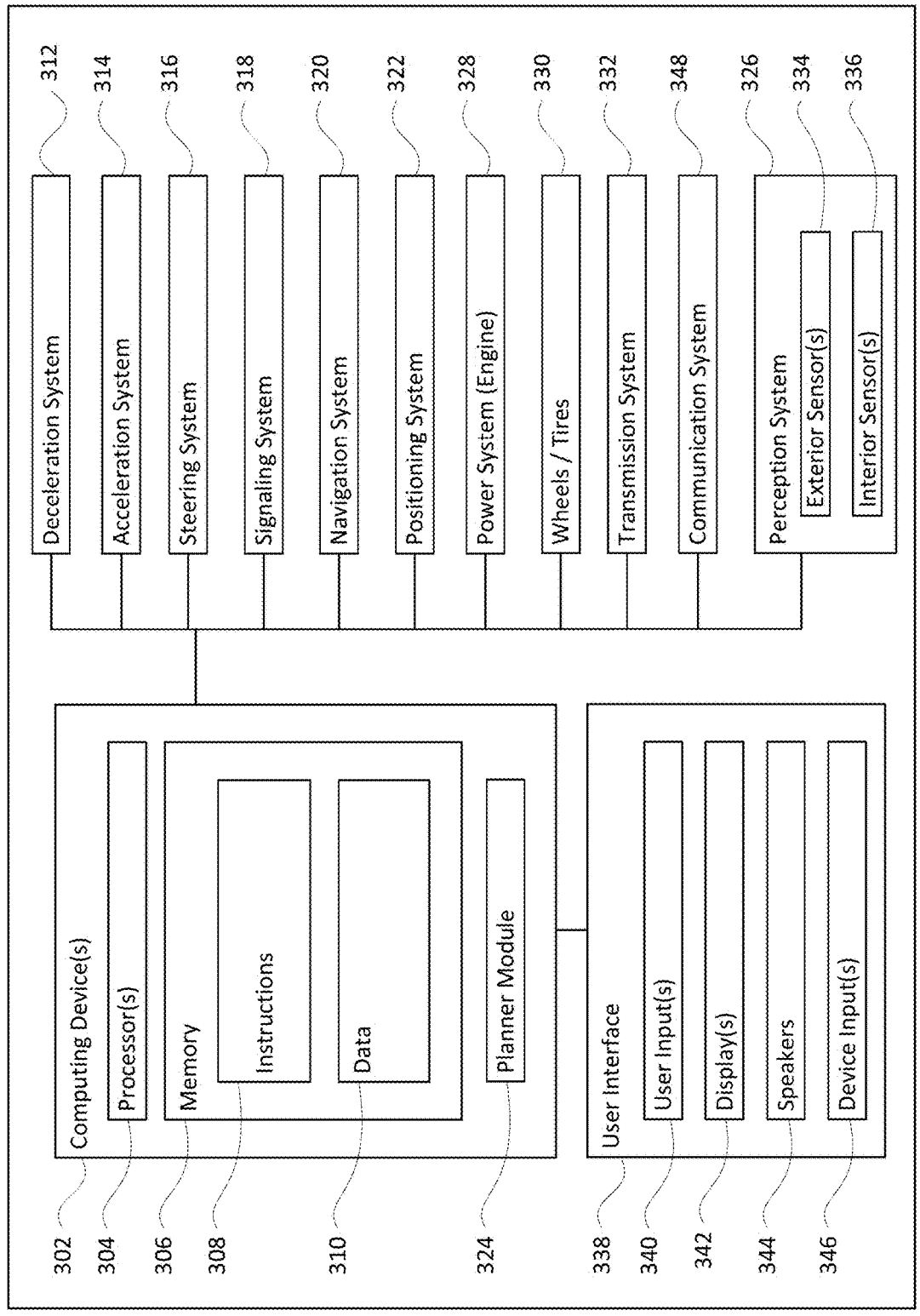
FIG. 3 is a block diagram of systems of an example vehicle in accordance with aspects of the technology.

FIG. 3 illustrates a block diagram 300 with various components and systems of an exemplary vehicle, such as passenger vehicle 100, to operate in an autonomous driving mode. As shown, the block diagram 300 includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The computing system may control overall operation of the vehicle when operating in an autonomous driving mode.

The memory 306 stores information accessible by the processors 304, including instructions 308 and data 310 that may be executed or otherwise used by the processors 304. The memory 306 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 308 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 310 may be retrieved, stored or modified by one or more processors 304 in accordance with the instructions 308. In one example, some or all of the memory 306 may be an event data recorder or other secure data storage system configured to store vehicle diagnostics and/or obtained sensor data, which may be on board the vehicle or remote, depending on the implementation.

The processors 304 may be any conventional processors, such as commercially available CPUs. Alternatively, each processor may be a dedicated device such as an ASIC or other hardware-based processor. Although FIG. 3 functionally illustrates the processors, memory, and other elements of computing devices 302 as being within the same block, such devices may actually include multiple processors, computing devices, or memories that may or may not be stored within the same physical housing. Similarly, the memory 306 may be a hard drive or other storage media located in a housing different from that of the processor(s) 304. Accordingly, references to a processor or computing device will be understood to include references to a collection of processors or computing devices or memories that may or may not operate in parallel.

In one example, the computing devices 302 may form an autonomous driving computing system incorporated into vehicle 100. The autonomous driving computing system is configured to communicate with various components of the vehicle. For example, the computing devices 302 may be in communication with various systems of the vehicle, including a driving system including a deceleration system 312 (for controlling braking of the vehicle), acceleration system 314 (for controlling acceleration of the vehicle), steering system 316 (for controlling the orientation of the wheels and direction of the vehicle), signaling system 318 (for controlling turn signals), navigation system 320 (for navigating the vehicle to a location or around objects) and a positioning system 322 (for determining the position of the vehicle, e.g., including the vehicle's pose). The autonomous driving computing system may employ a planner module 324, in accordance with the navigation system 320, the positioning system 322 and/or other components of the system, e.g., for determining a route from a starting point to a destination or for making modifications to various driving aspects in view of current or expected traction conditions.

The computing devices 302 are also operatively coupled to a perception system 326 (for detecting objects in the vehicle's internal and external environments), a power system 328 (for example, a battery and/or gas or diesel powered engine) and a transmission system 332 in order to control the movement, speed, etc., of the vehicle in accordance with the instructions 308 of memory 306 in an autonomous driving mode which does not require or need continuous or periodic input from a passenger of the vehicle. Some or all of the wheels/tires 330 are coupled to the transmission system 332, and the computing devices 32 may be able to receive information about tire pressure, balance and other factors that may impact driving in an autonomous mode.

The computing devices 302 may control the direction and speed of the vehicle, e.g., via the planner module 324, by controlling various components. By way of example, computing devices 302 may navigate the vehicle to a destination location completely autonomously using data from the map information and navigation system 320. Computing devices 302 may use the positioning system 322 to determine the vehicle's location and the perception system 326 to detect and respond to objects when needed to reach the location safely. In order to do so, computing devices 302 may cause the vehicle to accelerate (e.g., by increasing fuel or other energy provided to the engine by acceleration system 314), decelerate (e.g., by decreasing the fuel supplied to the engine, changing gears, and/or by applying brakes by deceleration system 312), change direction (e.g., by turning the front or other wheels of vehicle 100 by steering system 316), and signal such changes (e.g., by lighting turn signals of signaling system 318). Thus, the acceleration system 314 and deceleration system 312 may be a part of a drivetrain or other type of transmission system 332 that includes various components between an engine of the vehicle and the wheels of the vehicle. Again, by controlling these systems, computing devices 302 may also control the transmission system 332 of the vehicle in order to maneuver the vehicle autonomously.

Navigation system 320 may be used by computing devices 302 in order to determine and follow a route to a location. In this regard, the navigation system 320 and/or memory 306 may store map information, e.g., highly detailed maps that computing devices 302 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

By way of example only, the perception system 326 may include one or more light detection and ranging (lidar) sensors, radar units, cameras (e.g., optical and/or IR imaging devices, with or without a neutral-density filter (ND) filter), positioning sensors (e.g., gyroscopes, accelerometers and/or other inertial components), acoustical sensors (e.g., microphones or sonar transducers), and/or any other detection devices.

As shown in FIG. 3, the perception system 326 includes one or more external sensors 334 for detecting objects external to the vehicle. The sensors 334 are located in one or more sensor units around the vehicle. The detected objects may be other vehicles, obstacles in the roadway, traffic signals, signs, trees, bicyclists, pedestrians, etc. The sensors 334 may also detect certain aspects of weather or other environmental conditions, such as snow, rain or water spray, or puddles, ice or other materials on the roadway.

The perception system 326 also includes other sensors 336 within the vehicle to detect objects and conditions within the vehicle, such as in the passenger compartment and trunk region. For instance, such sensors may detect, e.g., one or more persons, pets, packages, etc., as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.).

The raw data obtained by the sensors can be processed by the perception system 336 and/or sent for further processing to the computing devices 302 periodically or continuously as the data is generated by the perception system 336. Computing devices 302 may use the positioning system 322 to determine the vehicle's location and perception system 326 to detect and respond to objects when needed to reach the location safely, e.g., via adjustments made by planner module 324. In addition, the computing devices 302 may perform calibration of individual sensors, all sensors in a particular sensor assembly, or between sensors in different sensor assemblies or other physical housings.

Computing devices 302 may include all of the components normally used in connection with a computing device such as the processor and memory described above as well as a user interface subsystem 338. The user interface subsystem 338 may include one or more user inputs 340 (e.g., a mouse, keyboard, touch screen and/or microphone) and one or more display devices 342 (e.g., a monitor having a screen or any other electrical device that is operable to display information). In this regard, an internal electronic display may be located within a cabin of the vehicle (e.g., 204 in FIG. 2A) and may be used by computing devices 302 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 344 may also be located within the passenger vehicle. The passenger(s) may communication directly with the vehicle via one or more device inputs 346. The inputs 346 may include a touch screen on an internal electronic display, a microphone for receiving spoken instructions, a haptic sensor for receiving physical feedback, etc.

The vehicle also includes a communication system 348. For instance, the communication system 348 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. The communication system 348 may thus include one or more antennas located within the cabin and/or on the vehicle's roof, as well as one or more transceiver modules coupled to the antennas for providing wireless communication.

While the components and systems of FIG. 3 are generally described in relation to a passenger vehicle arrangement, as noted above the technology may be employed with other types of vehicles, such as buses, campers, cargo vehicles, etc.

Example Implementations

In view of the structures and configurations described above and illustrated in the figures, various aspects will now be described in accordance with aspects of the technology.

A self-driving vehicle, such as a vehicle with level 4 or level 5 autonomy that can perform driving actions without human operation, has unique requirements and capabilities. This includes making driving decisions based on a planned route, received traffic information, and objects in the external environment detected by the onboard sensors. It also includes determining a status of the vehicle before picking up a passenger, while transporting the passenger to his or her destination, and after the passenger exists the vehicle. In such situations, it may be beneficial to prevent passengers from folding down the rear seats, for instance for passenger safety or to limit access to certain onboard systems that may be located in the trunk or other storage area.

Figure 4A:
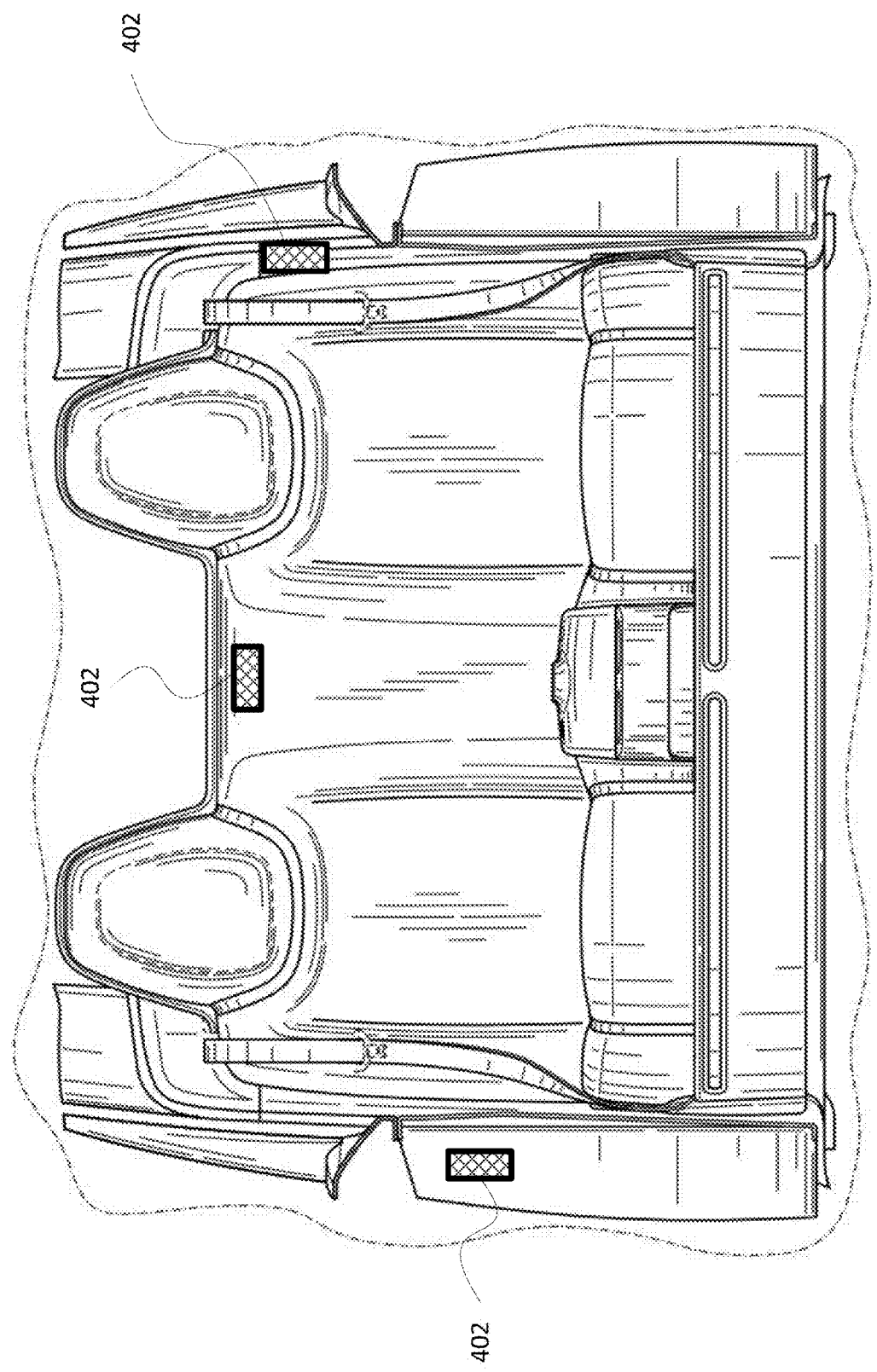
FIGS. 4A-B illustrate example views of interior sections of a vehicle in accordance with aspects of the technology.
Figure 4B:
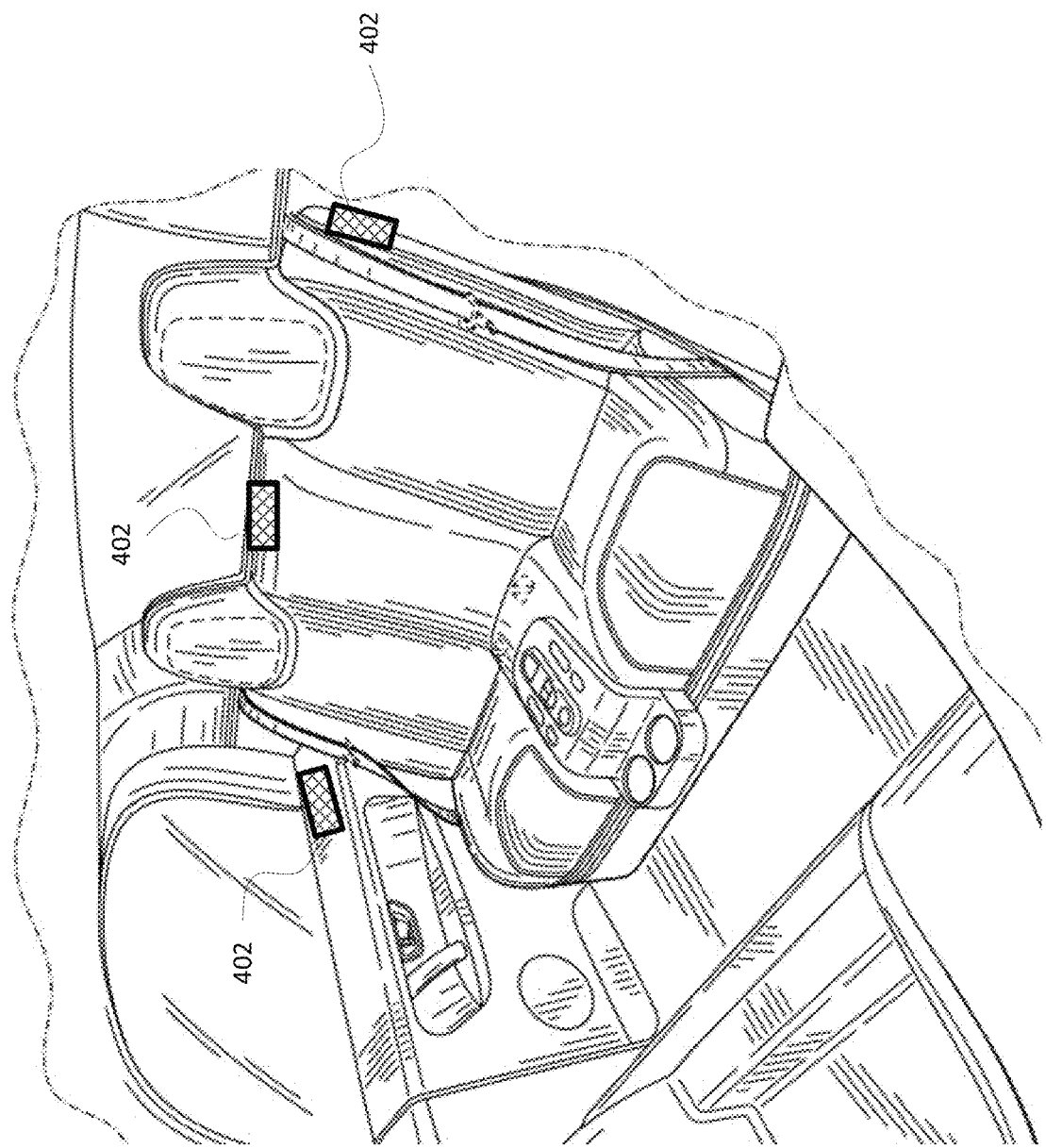

FIGS. 4A-B illustrate two views 400 and 420, respectively, of the rear seat area of a passenger vehicle such as vehicle 100 of FIG. 1A. One or more latching mechanism receptacles 402 may be provided in order to fold down the rear seat(s). For instance, a latching mechanism receptacle 402 may be located on or adjacent to the seat itself, on the door next to the seat, etc. The latching mechanism receptacle receives a latch mechanism such as a latch, clasp, handle, button or other actuator designed to allow the seat to fold down. Actuating the latch mechanism may enable the user to fold down one individual seat or the entire rear seat back. This can enable splitting of the rear seats, such as to provide a 60/40 fold-down option.

FIGS. 5A-B illustrate one example of a lockout assembly 500 that can be used to close off the latching mechanism receptable and prevent a passenger from folding down one or both of the rear seats. As shown, the lockout assembly 500 includes a base unit 502 and a cover 504. The cover 504 may be releasably secured to the base unit 502 using one or more clip members 506. The base unit 502 may be fixedly secured to the latching mechanism receptacle via one or more fastener members 508, such as a screw or other fastener.

Figure 6B:
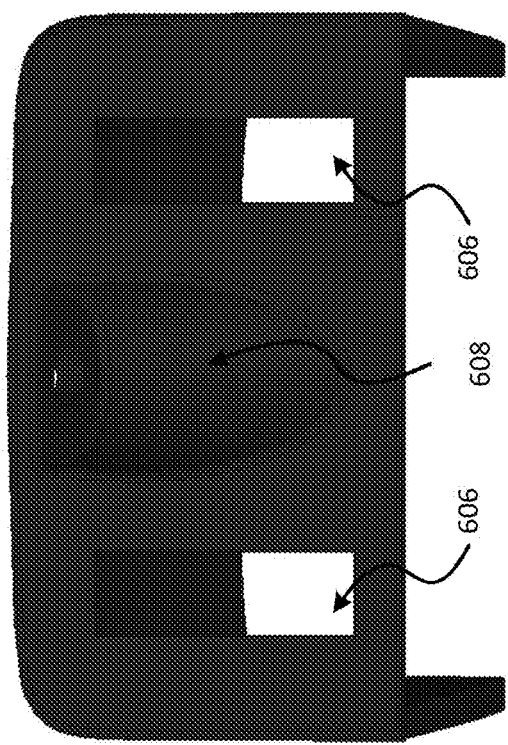
FIGS. 6A-G illustrate an example of a lockout assembly base unit in accordance with aspects of the technology.
Figure 6C:
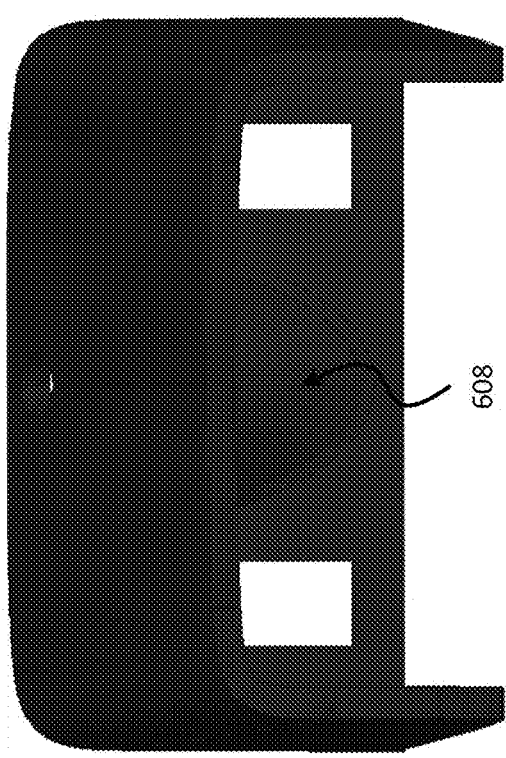
Figure 6A:
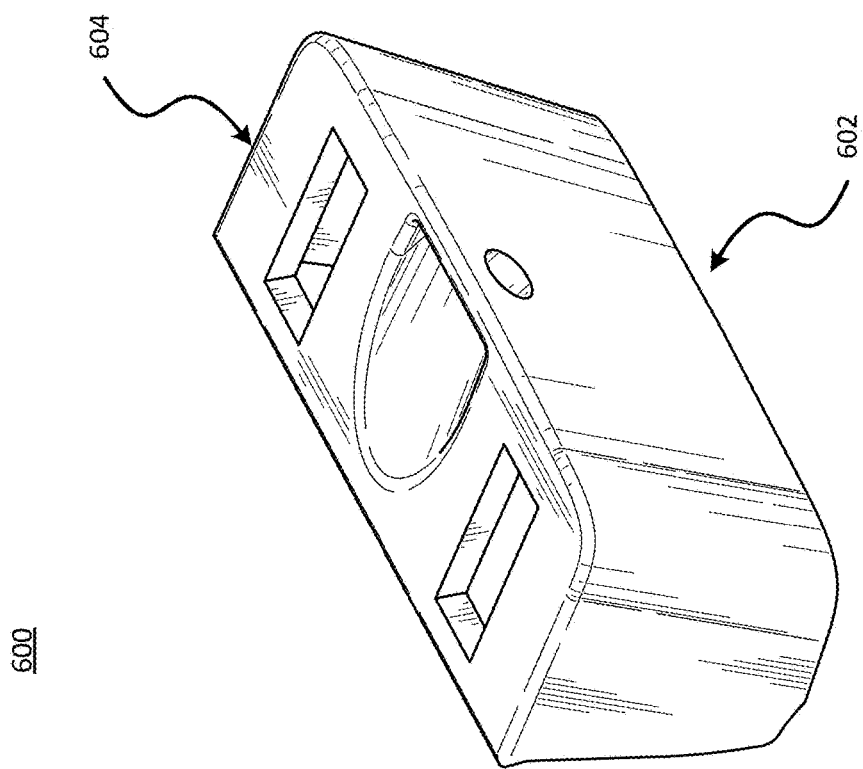
Figure 6E:
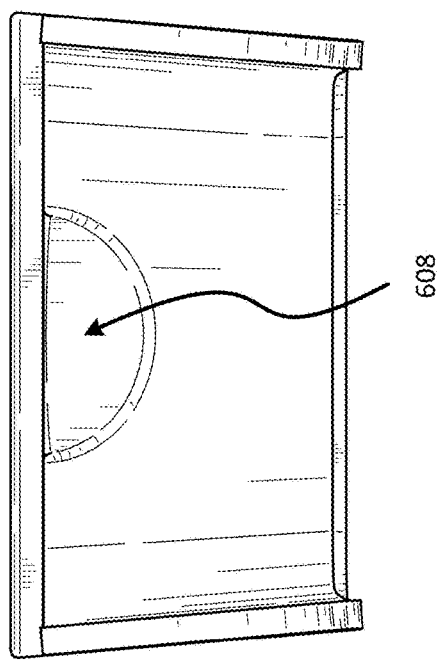
Figure 6G:
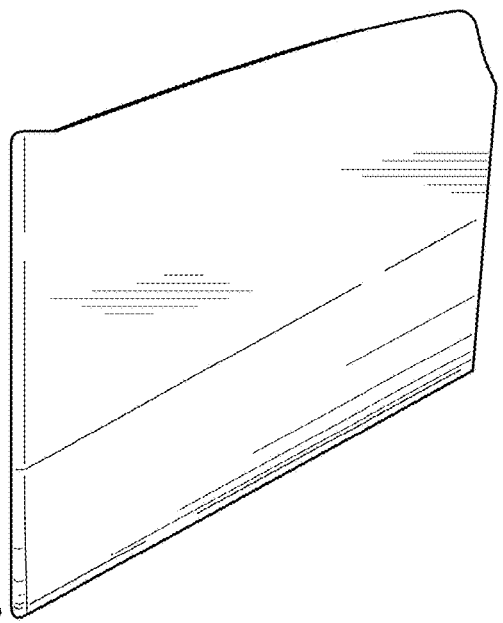
Figure 6D:
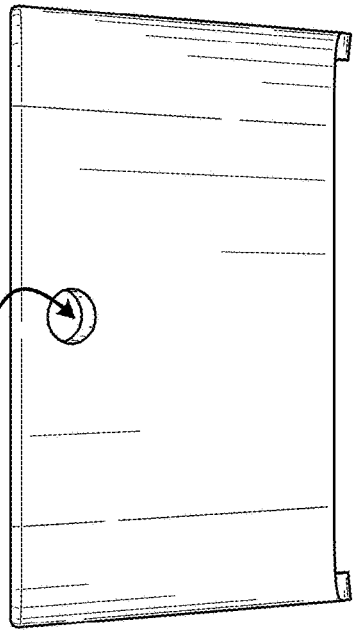
Figure 6F:
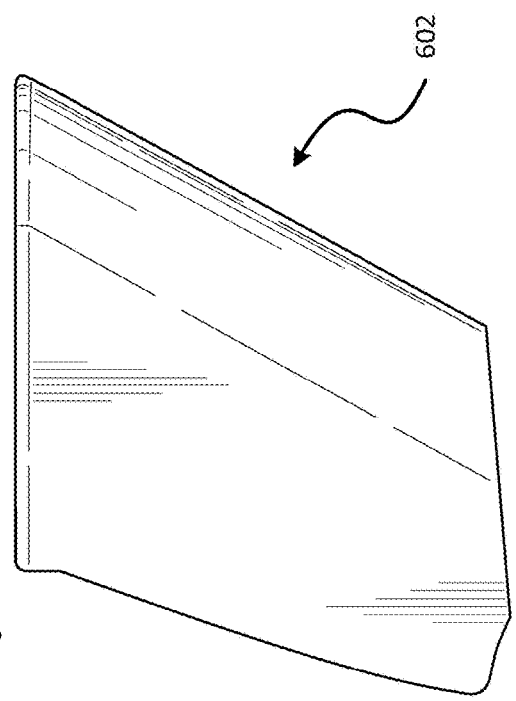
Figure 7F:
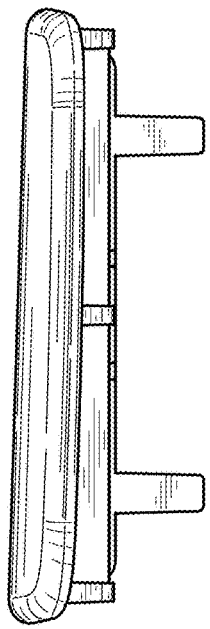
Figure 7H:
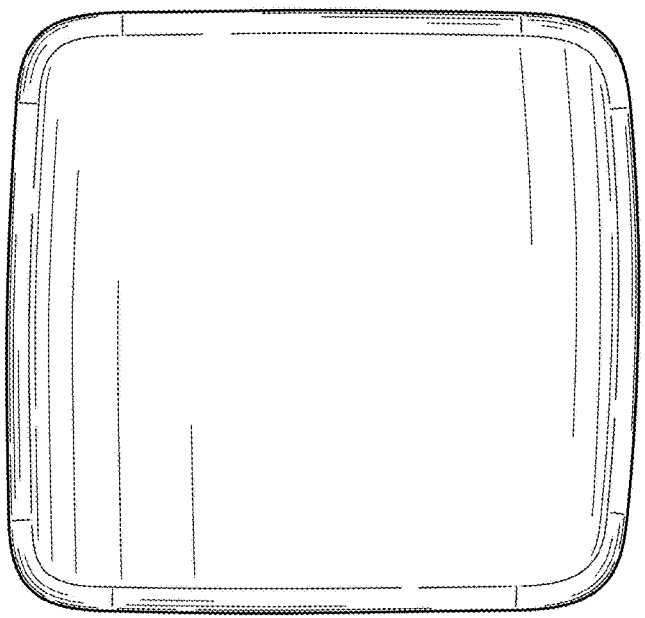
Figure 7E:
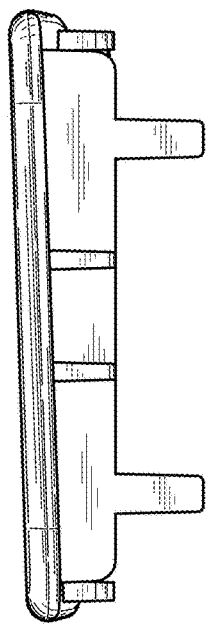
Figure 7G:
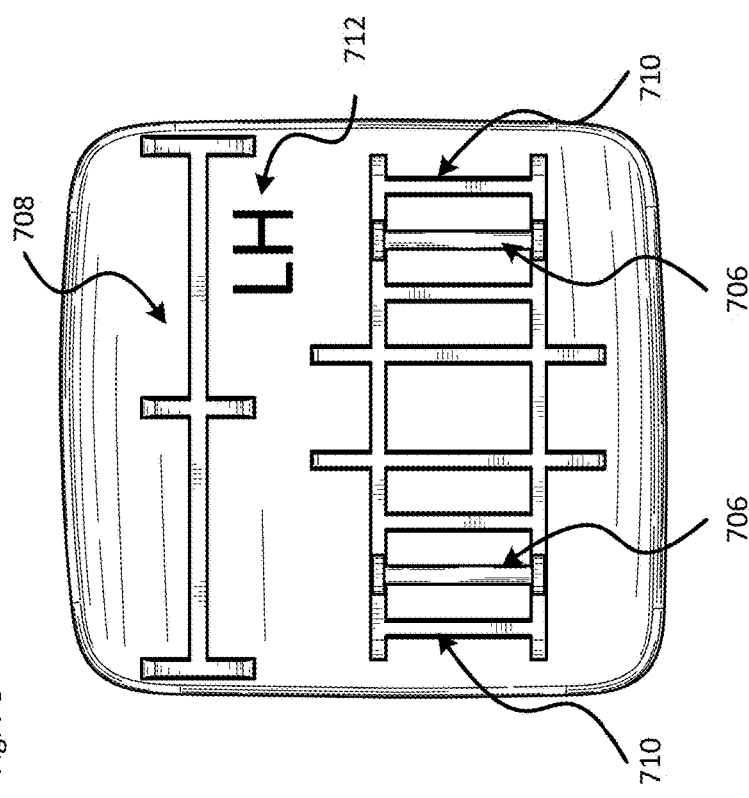

FIGS. 6A-G illustrate an example 600 of the base unit 502. The base unit includes a lower section 602 and an upper section 604. The lower section 602 includes a sidewall configured to be received within the latching mechanism receptacle. The upper section 604 may be arranged generally perpendicular to the lower section. The upper section 604 extends across the lower section 602, and is adapted to receive the cover 504. In this example, the upper section 604 includes a pair of slots 606 for receiving portions of the cover. In other examples only one slot or more than two slots may be provided, in order to correspond to the receiving portions of the cover. As seen in the top perspective view of FIG. 6B, the bottom perspective view of FIG. 6C and the rear view of FIG. 6E, there may be a receptacle area 608 adapted to receive the fastener member(s), which can be securely fixed to the latching mechanism receptacle through hole 610 illustrated in the front view of FIG. 6D. The right side view of FIG. 6F and the left side view of FIG. 6G illustrate that the sidewall of the lower section 602 may be angled or otherwise configured to fit within the latching mechanism receptacle. The base unit may be formed of a single piece of plastic, metal or other material, for instance using a mold or 3D printing.

FIGS. 7A-H illustrate an example 700 of the cover 504. The cover includes a first side 702 and a second side 704 opposite the first side. As seen in the top perspective view of FIG. 7A and the top view of FIG. 7H, the first side 702 may be generally planar or smooth, in order to provide a continuous surface across the latching mechanism receptacle. As illustrated in the bottom perspective view of FIG. 7B and the bottom view of FIG. 7G, the second side 704 includes a pair of projections 706 extending therefrom, which are configured to be received by the slots 606 of the base unit. Reinforcement elements 708 and/or 710 may be positioned along one or more sections of the second side of the cover. In one example, the reinforcement element 710 is integrally formed with at least one of the projections 706. And as shown, the second side may include an identifier 712, such as text, an icon, a shape, etc., to indicate which latching mechanism receptacle the cover goes to. A corresponding identifier may also be provided on the base unit, to facilitate installation in the latching mechanism receptacle. For example, "LH" may indicate that the cover (and/or base unit) are designed to fit a latching mechanism receptacle located on a left side of the rear seat. The contouring of the first side of the cover is illustrated in the right side view of FIG. 7C and the left side view of FIG. 7D, as well as the front view of FIG. 7E and rear view of FIG. 7F. The cover may be formed of a single piece of plastic, metal or other material, for instance using a mold or 3D printing.

FIGS. 8A-E illustrate an example of clip member 506. As seen in the perspective view of FIG. 8A and the side view of FIG. 8B, the clip member may have a generally U- or V-shaped arrangement 800 having opposing ends 802, with a receptacle area 804 for receiving one of the projections 706 of the cover. As seen in the front view of FIG. 8C, one or more pairs of opposing first arm members 806 are arranged within the receptacle area. By way of example, the top view of FIG. 8D illustrates two pairs of first arm members 806, in particular pair 806*a* and 806*b*. While two pairs are shown, there may be one or more than two pairs of opposing first arm members. The first arm members may be arranged as spring elements or otherwise tensioned to secure the projection within the receptacle area 804. And as seen in the front view of FIG. 8C and the top view of FIG. 8D, the ends of the opposing first arm members may be offset with respect to one another. FIG. 8B also illustrates a set of opposing second arm members 808. This figure, along with top view 8D and bottom view 8E, show that the two arm members 808 are arranged to face one another. When the clip member 506 is inserted into the slot 606, the arm members 808 are able to secure the clip member to the base unit.

FIG. 9 illustrates an example 900 of fastener member 508, which secures the base unit to the latching mechanism receptacle as described further below. The fastener member may be, e.g., a screw, bolt or other fastener element.

Figure 10A:
FIGS. 10A-C illustrate an example of a portion of lockout assembly clip member in accordance with aspects of the technology.
Figure 10C:
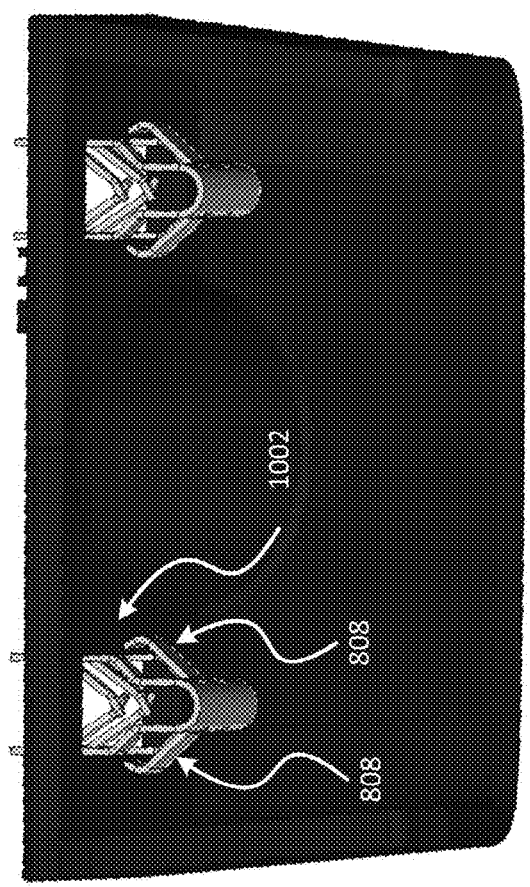
Figure 10B:
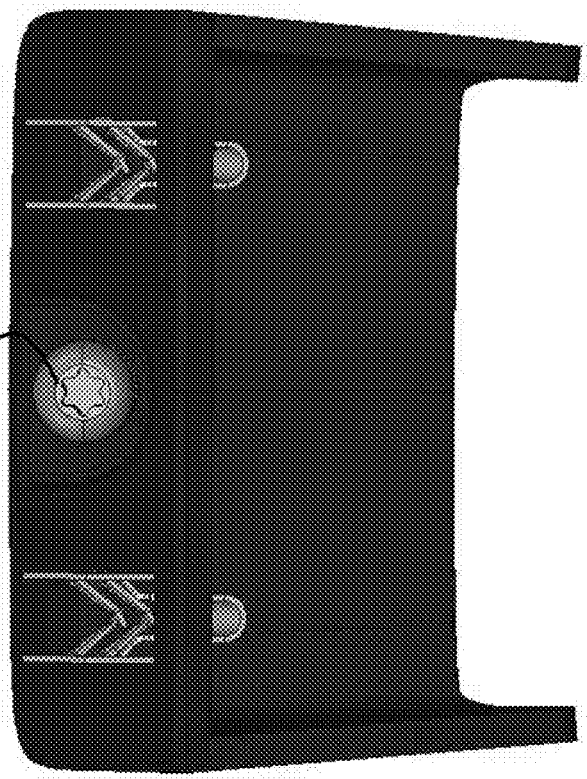

FIGS. 10A-C illustrate the clip members and fastener member arranged in the base unit, without the cover. As seen in the perspective view of FIG. 10A, the opposing ends 802 of the clip member extend above top surface 1000 of the upper section of the base unit. As seen in the rear perspective view of FIG. 10B, the fastener member 508 is received by the through hole of the base unit. And as seen in the rear view of FIG. 10C, the arm member 808 of the clip member are arranged to press against bottom surface 1002 of the upper section of the base unit, for instance to prevent the cover from easily slipping off of the base unit. By way of example, this arrangement may prevent the cover from being disengaged from the base unit unless a threshold force level is exceeded. The threshold level of force may depend on the materials used and/or the spring force or tension force of the first arm members, etc.

Figure 11B:
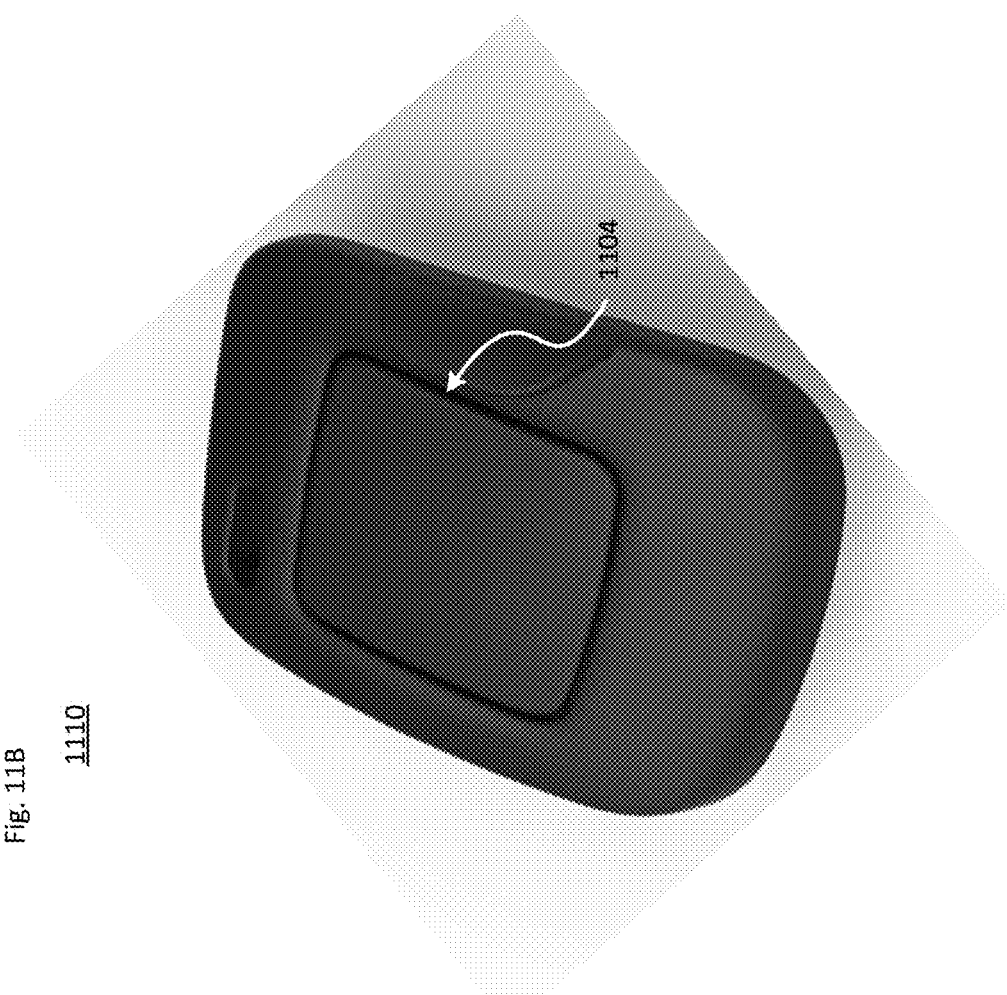
FIGS. 11A-D illustrate examples of lockout assembly cover arrangements in accordance with aspects of the technology.
Figure 11A:
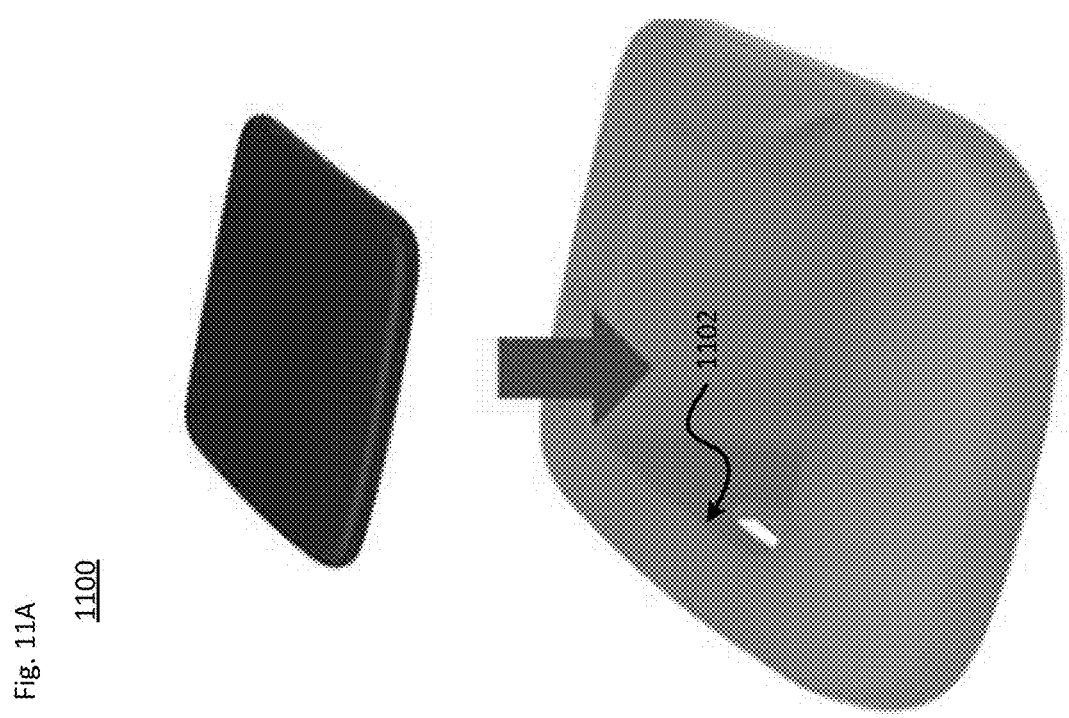

FIGS. 11A-B illustrate insertion of a cover onto a latching mechanism receptacle. In view 1100 of FIG. 11A, the base unit, clip members and fastener member are omitted. Here, the latching mechanism receptacle has an inner edge 1102, which the cover is sized to fit. As shown in view 1110 of FIG. 11B, once the cover is inserted, it may be completely or substantially flush with the inner edge 1102. In one scenario, there may be a gap 1104 on the order of 1.0 mm-3.0 mm between the inner edge 1102 and the perimeter of the cover. Here, a thin wire (e.g., a loop of wire), flat-headed screwdriver or other tool (not shown) may be insertable into the gap and used to pull up the cover away from the base unit and off of the latching mechanism receptacle.

Figure 11D:
Figure 11C:

In another scenario, as shown in view 1120 of FIG. 11C, a slot 1122 may be provided along the inner edge of the latching mechanism receptacle, which is larger than the gap around the perimeter of the cover. Here, the receptacle may be arranged so that a tool can be used to pull up the cover away from the base unit. And in another scenario, as shown in view 1130 of FIG. 11D, a receptacle 1132 may be provided along the edge of the cover. As above, the receptacle 1132 can be larger than the gap around the perimeter of the cover. Here, the receptacle may be arranged so that a tool can be used to pull up the cover away from the base unit.

Figure 12:
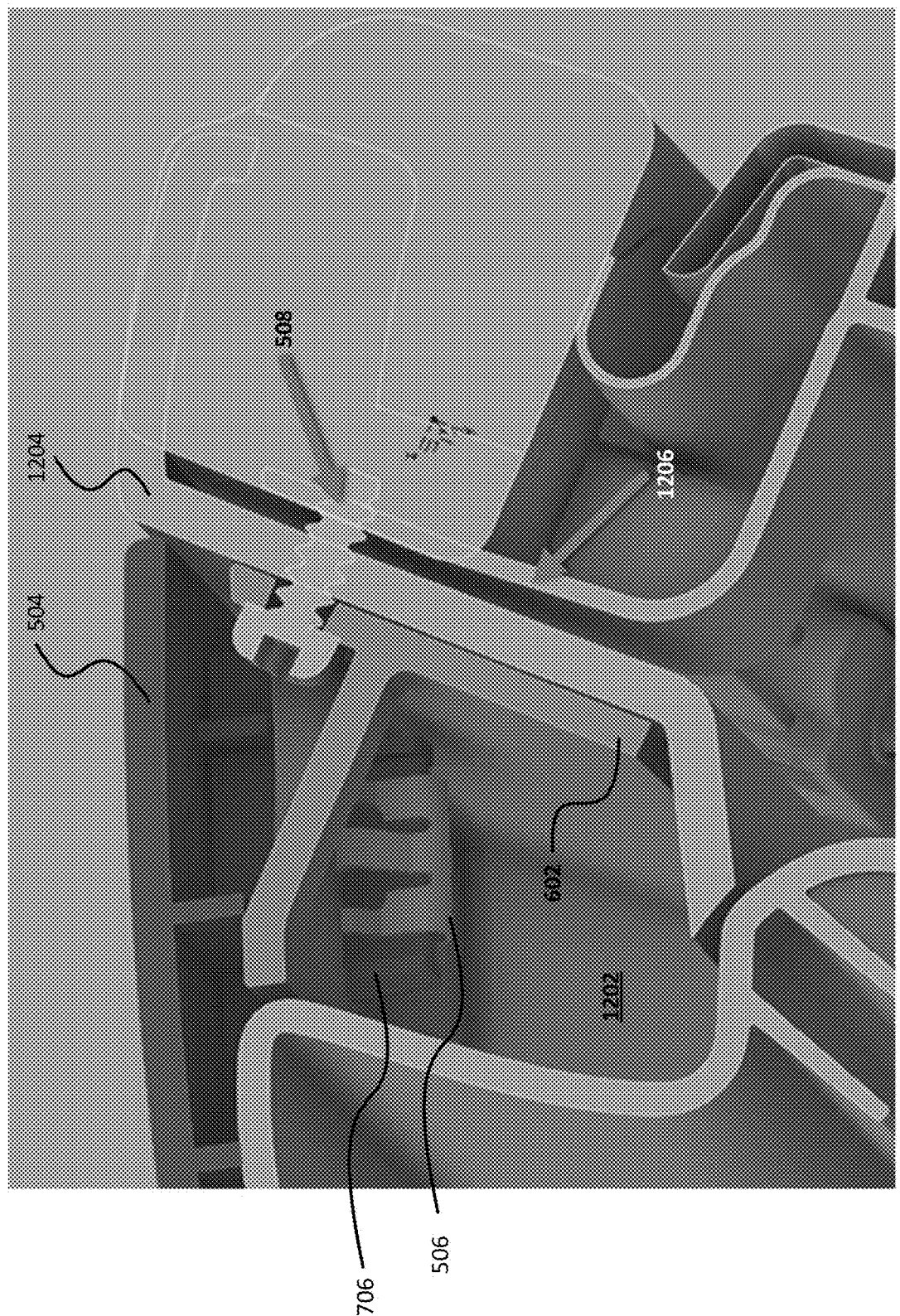
FIG. 12 illustrates a cutaway view of an installed lockout assembly in accordance with aspects of the technology.

FIG. 12 illustrates a cutaway view 1200 of an example lockout assembly received by a latching mechanism receptable 1202. As shown, the lower section 602 of the base unit 502 is flush against a sidewall 1204 of the receptacle 1202. The cover 504 is held in place with respect to the base unit 502, in which the projections 706 are retained by respective clip members 506. In this example, fastener member 508 is threadedly engaged with the sidewall 1204, and may also be secured to another wall section 1206, which may be part of the latching mechanism or another part of the vehicle. As noted above, this arrangement may releasably secure the cover to the base unit, while the base unit may be fixedly secured to the latching mechanism receptacle.

Figure 13B:
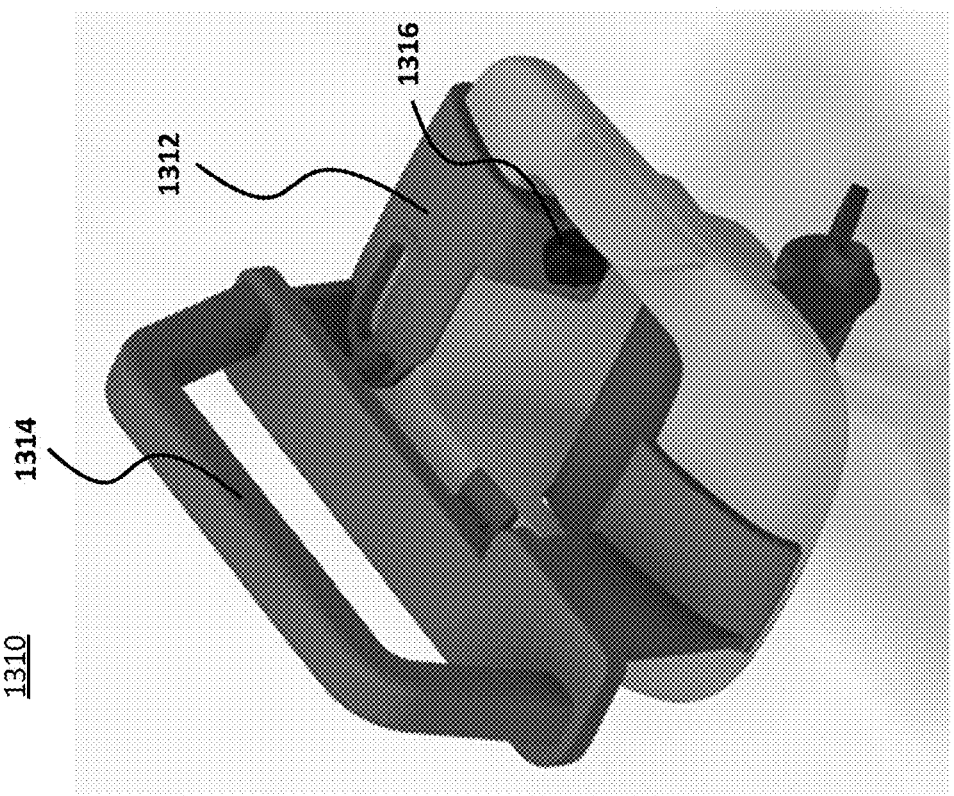
FIGS. 13A-B illustrate example tool assemblies in accordance with aspects of the technology.
Figure 13A:
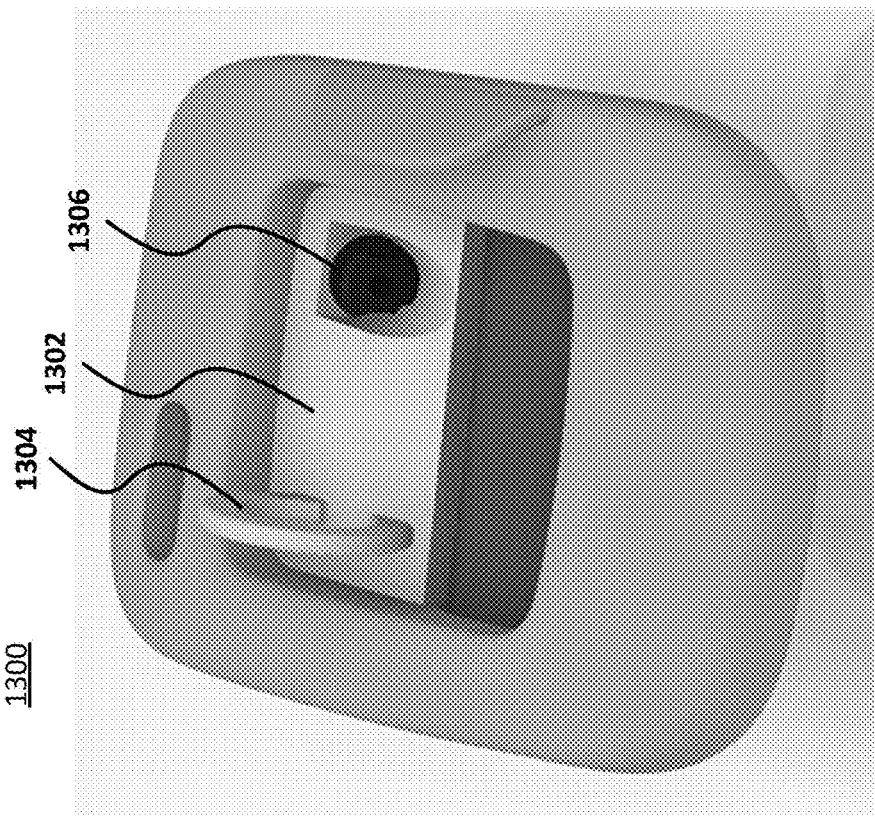

Unless the latching mechanism receptacle is preconfigured to receive the base unit, it may be necessary to drill a hole in the sidewall prior to securing the base unit. FIGS. 13A and 13B illustrate two examples of a removable drill jig that can be used to create the hole. In particular, FIG. 13A illustrates one example 1300 and FIG. 13B illustrates another example 1310 of drill jigs. As shown in FIG. 13A, the example 1300 includes a guide member 1302 with a handle 1304 for easy insertion into the receptacle. Here, a drill bit 1306 is arranged in the guide member to drill the hole in a specified area of the receptacle. And as shown in FIG. 13B, the example 1310 includes a guide member 1312 that spans the length of the receptacle. The guide member 1312 includes a handle 1314 for easy placement on the receptacle. Here, a drill bit 1316 is arranged in the guide member to drill the hole in a specified area of the receptacle. Alternatively, once the base unit is inserted into the receptacle, a self-tapping screw may be threadedly secured to the sidewall.

Figure 14:
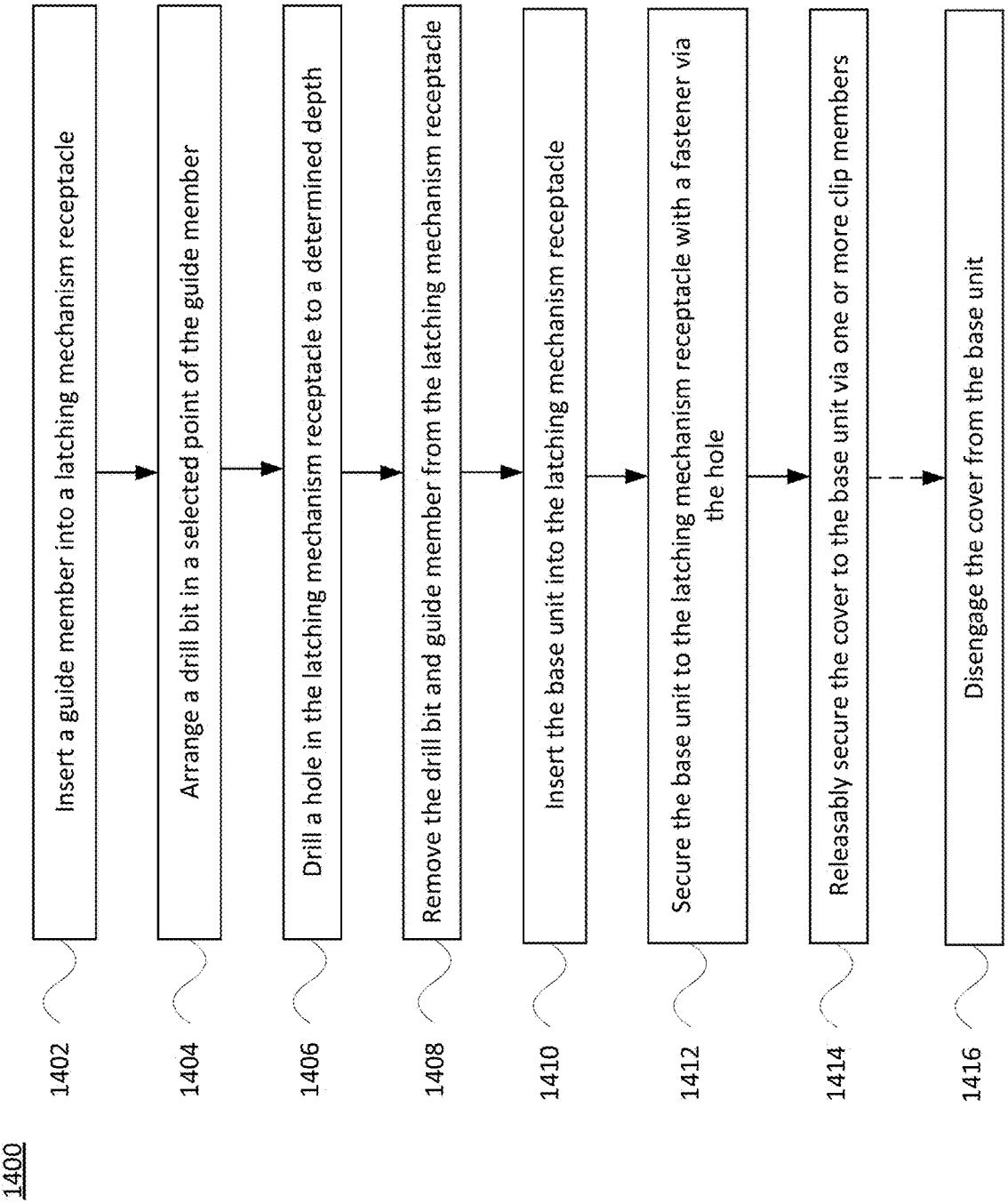
FIG. 14 is a flow diagram in accordance with aspects of the technology.

FIG. 14 illustrates a flow diagram 1400 for installation of the lockout assembly. First, as shown in block 1402, a guide member is inserted into a latching mechanism receptacle. The guide member may be one of the configurations described above with regard to FIGS. 13A-B. At block 1404, a drill bit is arranged in a selected point of the guide member, for instance to be aligned with a particular point of the latching mechanism receptacle sidewall and (optionally) with another wall section (e.g., section 1206 shown in FIG. 12). At block 1406, a hole is drilled at the particular point to a predetermined depth (e.g., 0.5-1.5 cm, or more or less). At block 1408 the drill bit and guide member are removes from the receptacle. Then, at block 1410, the base unit of the lockout assembly is inserted into the receptacle. The base unit is secured within the receptacle at block 1412, by engaging the fastener to the hole. This can include threadedly engaged with the sidewall of the receptacle, and may also involve the fastener being secured to the other wall section, which may be part of the latching mechanism or another part of the vehicle. At block 1414, the cover is releasably secured to the base unit, e.g., via one or more clip members (as described above) or other engagement mechanisms. Optionally, at block 1416, the cover may be disengaged from the base unit using a tool, such as described above with regard to FIGS. 11C and 11D.

Finally, as noted above, the technology is applicable for various types of vehicles, including passenger cars, buses, RVs and trucks or other cargo carrying vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A lockout assembly for a vehicle configured to operate in an autonomous driving mode, the vehicle including a latching mechanism receptacle with a latching mechanism, disposed in a cabin of the vehicle, the lockout assembly comprising:
   a base unit having a first section and a second section, the first section extending across the second section and having one or more slots therein, the second section including a sidewall adapted to be received within the latching mechanism receptacle of the cabin of the vehicle, the base unit configured to be fixedly secured within the latching mechanism receptacle;
   a cover having a first side and a second side opposite the first side, the first side providing a continuous surface to cover an opening of the latching mechanism receptacle, the second side including one or more projections removably coupled to the one or more slots of the base unit;
   wherein, when the base unit is fixedly secured within the latching mechanism receptacle, the cover and the first section of the base unit are adapted to prevent passenger access to the latching mechanism within the latching mechanism receptacle so that one or more seats of the vehicle cannot be folded down.

2. The lockout assembly of claim 1, further comprising a fastener, wherein:
   the sidewall of the second section of the base unit includes a through hole, and the fastener is adapted to fixedly secured the base unit within the latching mechanism receptacle via the through hole and corresponding engagement with a sidewall of the latching mechanism receptacle.

3. The lockout assembly of claim 2, further comprising:
   one or more clip members each at least partly received within a corresponding one of the one or more slots of the first section of the base unit;
   wherein each of the one or more projections are received by corresponding ones of the one or more clip members.

4. The lockout assembly of claim 3, wherein each clip member includes:
   a receptacle area adapted to receive a corresponding one of the one or more projections; and
   one or more pairs of opposing first arm members arranged within the receptacle area, the one or more pairs of opposing first arm members adapted to grip the corresponding projection.

5. The lockout assembly of claim 4, wherein the one or more pairs of opposing first arm members comprise spring elements.

6. The lockout assembly of claim 4, wherein each pair of the one or more pairs of opposing first arm members are offset with respect to one another.

7. The lockout assembly of claim 4, further including a set of opposing second arm members configured to secure the clip member to the base unit.

8. The lockout assembly of claim 7, wherein the set of opposing second arm members are arranged external to the receptacle area.

9. The lockout assembly of claim 3, wherein each clip member at least partly extends above a top surface of the first section of the base unit and at least partly extends below a bottom surface of the first section of the base unit.

10. The lockout assembly of claim 1, wherein the second side of the cover further includes one or more reinforcement elements.

11. The lockout assembly of claim 10, wherein a given one of the reinforcement elements is integrally formed with at least one of the projections.

12. The lockout assembly of claim 1, wherein the second side of the cover further includes an identifier to indicate which latching mechanism of the vehicle is to be covered.

13. The lockout assembly of claim 1, wherein, when the cover is covering the latching mechanism receptacle, the cover provides a gap of no more than 3.0 mm between a perimeter of the cover and an inner edge of the latching mechanism receptacle.

14. The lockout assembly of claim 1, wherein the cover includes a receptacle arranged along an edge thereof, the receptacle being adapted to receive a tool for removal of the cover from the base unit.

15. A kit comprising:
   the lockout assembly of claim 1; and
   a tool configured to remove the cover from the base unit.

16. The kit of claim 15, wherein the tool is adapted for insertion in a gap between a perimeter of the cover and an inner edge of the latching mechanism receptacle.

17. The kit of claim 15, further comprising a removable drill jig, wherein:
   the removable drill jig includes a guide member arranged to align a drill bit with a predetermined location along a sidewall of the latching mechanism receptacle.

18. The kit of claim 17, wherein the removable drill jig further includes a handle for insertion and removal of the drill jig into the latching mechanism receptacle.

19. A vehicle configured to operate in an autonomous driving mode, the vehicle including:
   the lockout assembly of claim 1; and
   the latching mechanism receptacle having the latching mechanism therein, the latching mechanism being configured to release a lock for the one or more seats so that the one or more seats are foldable.

20. The vehicle of claim 19, wherein the latching mechanism receptacle includes a slot arranged along an edge thereof, the slot being adapted to receive a tool for removal of the cover from the base unit.

* * * * *